(12) United States Patent
Kiyotake et al.

(10) Patent No.: US 7,845,716 B2
(45) Date of Patent: Dec. 7, 2010

(54) FRONT STRUCTURE OF AUTOMOTIVE VEHICLE

(75) Inventors: Shinji Kiyotake, Hatsukaichi (JP); Takayuki Kimura, Higashihiroshima (JP); Masanobu Kobashi, Hiroshima (JP); Hidenori Matsuoka, Hiroshima (JP); Sakayu Terada, Hiroshima (JP)

(73) Assignee: Mazda Motor Corporation (JP)

( * ) Notice: Subject to any disclaimer, the term of this patent is extended or adjusted under 35 U.S.C. 154(b) by 97 days.

(21) Appl. No.: 12/108,656

(22) Filed: Apr. 24, 2008

(65) Prior Publication Data

US 2008/0265623 A1 Oct. 30, 2008

(30) Foreign Application Priority Data

Apr. 24, 2007 (JP) ............................. 2007-113997
Oct. 2, 2007 (JP) ............................. 2007-258211

(51) Int. Cl.
*B62D 21/15* (2006.01)

(52) U.S. Cl. ............................................... 296/203.02

(58) Field of Classification Search ............ 296/203.02, 296/202, 203.01, 204, 203.03, 187.09, 187.08, 296/187.1, 193.09, 146.6, 187.03
See application file for complete search history.

(56) References Cited

U.S. PATENT DOCUMENTS

| | | | | |
|---|---|---|---|---|
| 4,750,780 A | * | 6/1988 | Harasaki et al. | ............. 296/192 |
| 4,950,024 A | * | 8/1990 | Watari et al. | ............... 296/192 |
| 7,461,890 B2 | * | 12/2008 | Yatsuda | ................. 296/203.02 |
| 7,556,310 B2 | * | 7/2009 | Miki | ........................... 296/204 |
| 7,594,692 B2 | * | 9/2009 | Shishido | ............... 296/203.02 |
| 2004/0026957 A1 | * | 2/2004 | Bodin et al. | ............. 296/146.6 |
| 2004/0080179 A1 | * | 4/2004 | Okazaki et al. | ........... 296/146.6 |
| 2005/0077711 A1 | * | 4/2005 | Yasui et al. | ................. 280/735 |
| 2007/0176443 A1 | * | 8/2007 | Yasuhara et al. | ............ 293/133 |
| 2007/0215402 A1 | * | 9/2007 | Sasaki et al. | ................ 180/232 |
| 2007/0252412 A1 | * | 11/2007 | Yatsuda | ................. 296/193.09 |
| 2008/0150326 A1 | * | 6/2008 | Maruyama et al. | .......... 296/192 |
| 2008/0169686 A1 | * | 7/2008 | Hedderly | ..................... 296/204 |
| 2008/0224502 A1 | * | 9/2008 | Miki | ..................... 296/203.02 |
| 2008/0238150 A1 | * | 10/2008 | Nakamura et al. | ..... 296/203.02 |

FOREIGN PATENT DOCUMENTS

EP 0878379 A1 11/1998
JP 2003182633 7/2003

OTHER PUBLICATIONS

European Search Report for EP 08006888 sent Jul. 4, 2008 (Full).

* cited by examiner

*Primary Examiner*—Hilary Gutman
(74) *Attorney, Agent, or Firm*—Studebaker & Brackett PC; Donald R. Studebaker

(57) ABSTRACT

A support frame is provided to extend upward and rearward from a portion of a front side frame near a suspension tower substantially straight and connect to an upper portion of a hinge pillar. Accordingly, there can be provided a front structure of an automotive vehicle that can properly restrain a forward deformation of a cabin by transmitting an impact load at a vehicle frontal crash to the hinge pillar efficiently.

11 Claims, 18 Drawing Sheets

FRONT STRUCTURE OF AUTOMOTIVE VEHICLE

BACKGROUND OF THE INVENTION

The present invention relates to a front structure of an automotive vehicle that comprises a hinge pillar, dash panel, suspension tower and front side frame.

Conventionally, the above-described front structure of an automotive vehicle is known as disclosed in Japanese Patent Laid-Open Publication No. 2003-182633, for example. That is, as shown in FIG. 18, the front structure of an automotive vehicle comprises a pair of hinge pillars 91, 91 (only one illustrated in FIG. 18), a dash panel provided to interconnect the pair of hinge pillars 91, 91 so as to partition an engine room 92 from a vehicle compartment 93, a suspension tower 94 disposed in front of and away from the dash panel, and a front side frame 94 provided to extend in a vehicle longitudinal direction and connect to the suspension tower 94, a rear end of which bends downward and connects to a front portion of a floor frame. Herein, there is provided a gusset 99 as a support frame that is provided to extend obliquely upward and outward from a suspension-tower disposition portion 96 of the front side frame 95 along the suspension tower 94 and to connect to an apron upper member 98 in front of a front pillar 97. In FIG. 18, a reference numeral 1000 denotes a cowl, a reference numeral 1010 denotes a cowl reinforcement, a reference numeral 1020 denotes a bulkhead, and a reference numeral 1030 denotes a wheel arch.

In the above-described conventional structure, an impact load to be inputted to (act on) a vehicle body at a vehicle frontal crash may be transmitted, as shown by arrows illustrated with broken lines in FIG. 18, from the front side frame 95 to the gusset 99 via the suspension-tower disposition portion 96, and then outwardly in the vehicle width direction because of an attachment structure of the gusset 99, and finally to the front pillar 97 and the hinge pillar 91 via the apron upper member 98. Accordingly, a transmission efficiency of the impact load would not be superior.

Thus, the conventional front structure has a problem in that a forward deformation of a cabin due to the vehicle frontal crash could not be restrained properly.

SUMMARY OF THE INVENTION

An object of the present invention is to provide a front structure of an automotive vehicle that can properly restrain the forward deformation of the cabin by transmitting the impact load at the vehicle frontal crash to the hinge pillar efficiently.

According to the present invention, there is provided a front structure an automotive vehicle, comprising a pair of hinge pillars, a dash panel provided to interconnect the pair of hinge pillars so as to partition an engine room from a vehicle compartment, a suspension tower disposed in front of and away from the dash panel, a front side frame provided to extend in a vehicle longitudinal direction and connect to the suspension tower, a rear end of which bends downward and connects to a front portion of a floor frame, and a support frame provided to extend upward and rearward from a portion of the front side frame near the suspension tower substantially straight and connect to an upper portion of the hinge pillar.

According to the present invention, the impact load at the vehicle frontal crash can be efficiently transmitted to the upper portion of the hinge pillar via the support frame extending substantially straight, so that the impact load can be properly dispersed to the hinge pillar and the front pillar. Accordingly, the forward deformation of the cabin can be restrained properly.

According to an embodiment of the present invention, a cowl box is provided between the dash panel and the suspension tower, and the support frame is provided to extend just below the cowl box and connect to the upper portion of the hinge pillar. Thereby, since the support frame is provided to extend just below the cowl box and to connect to the upper portion of the hinge pillar, the connection portion of the support frame to the hinge pillar can be properly located at the upper portion of the hinge pillar. Accordingly, the restraint of the forward deformation of the cabin can be achieved effectively.

According to another embodiment of the present invention, an upper face portion of the support frame and a lower face portion of the cowl box are joined. Thereby, the rigidity of a cow-box side portion can be increased properly with the joining structure of the support frame and the cowl box by utilizing the support frame.

According to another embodiment of the present invention, a front end portion of an impact bar provided at a front door is positioned substantially at the same level as a connection portion of the support frame to the hinge pillar. Thereby, the efficient transmission and dispersion of the impact load can be achieved by utilizing the existing impact bar in the front door.

According to another embodiment of the present invention, a beltline reinforcement is provided at a beltline portion of a front door, a front end portion of an impact bar is disposed below the beltline portion at the front door, and a connection portion of the support frame to the hinge pillar is positioned at a level between the beltline portion and the front end portion of the impact bar. Thereby, the impact load is transmitted to both the beltline reinforcement and the impact bar via the support frame and the hinge pillar. Accordingly, the efficient transmission of the impact load can be achieved with a superior flexibility of layout of the impact bar (flexibility of location of the front end portion of the impact bar that is provided for a vehicle side crash).

According to another embodiment of the present invention, the front door is attached to the hinge pillar via a door hinge so as to open or close, and the connection portion of the support frame to the hinge pillar is positioned at a level that corresponds to the door hinge. Thereby, the impact load can be transmitted surely from the hinge pillar to the impact bar and the beltline reinforcement via the door hinge.

According to another embodiment of the present invention, there is provided a dash cross member that interconnects the pair of hinge pillars so as to form a closed cross section with a front face or a rear face of the dash panel, and the support frame is provided so that a rear portion thereof connects to the dash cross member directly or via the dash panel. Thereby, the impact load acting on the support frame from the front side frame can be dispersed to the hinge pillar via the dash cross member. Accordingly, even if the impact load would be larger, the front side frame can be properly restrained from bending.

According to another embodiment of the present invention, the support frame comprises a front member and a rear member, and the front member is provided on an engine-room-side face of a panel forming the suspension tower, and the rear member is provided on another face of the panel that is opposite to the engine-room-side face, a front end portion of the rear member overlapping a rear end portion of the front member. Thereby, a rear half of the support frame may not project toward the engine-room side of a wheel house.

Accordingly, interference of the support frame with any component provided behind the wheel house, such as a master cylinder of a brake device, can be prevented. Further, bending of the front side frame can be properly restrained by the support frame.

According to another embodiment of the present invention, the rear member of the support frame is configured so that a rear portion thereof expands to a suspension support portion that is provided at an upper portion of the suspension tower. Thereby, the impact load acting on the support frame from the front side frame can be dispersed to the dash panel and the suspension support portion. Accordingly, even if the impact load would be larger, the front side frame can be properly restrained from bending.

According to another embodiment of the present invention, there is provided a connection member that interconnects the dash panel and the suspension support portion longitudinally, and the connection member and a rear side of the rear member of the support frame form a closed cross section that is provided from the dash panel to the suspension support portion. Thereby, the rigidity between the dash panel and the suspension support portion of the wheel house can be increased.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
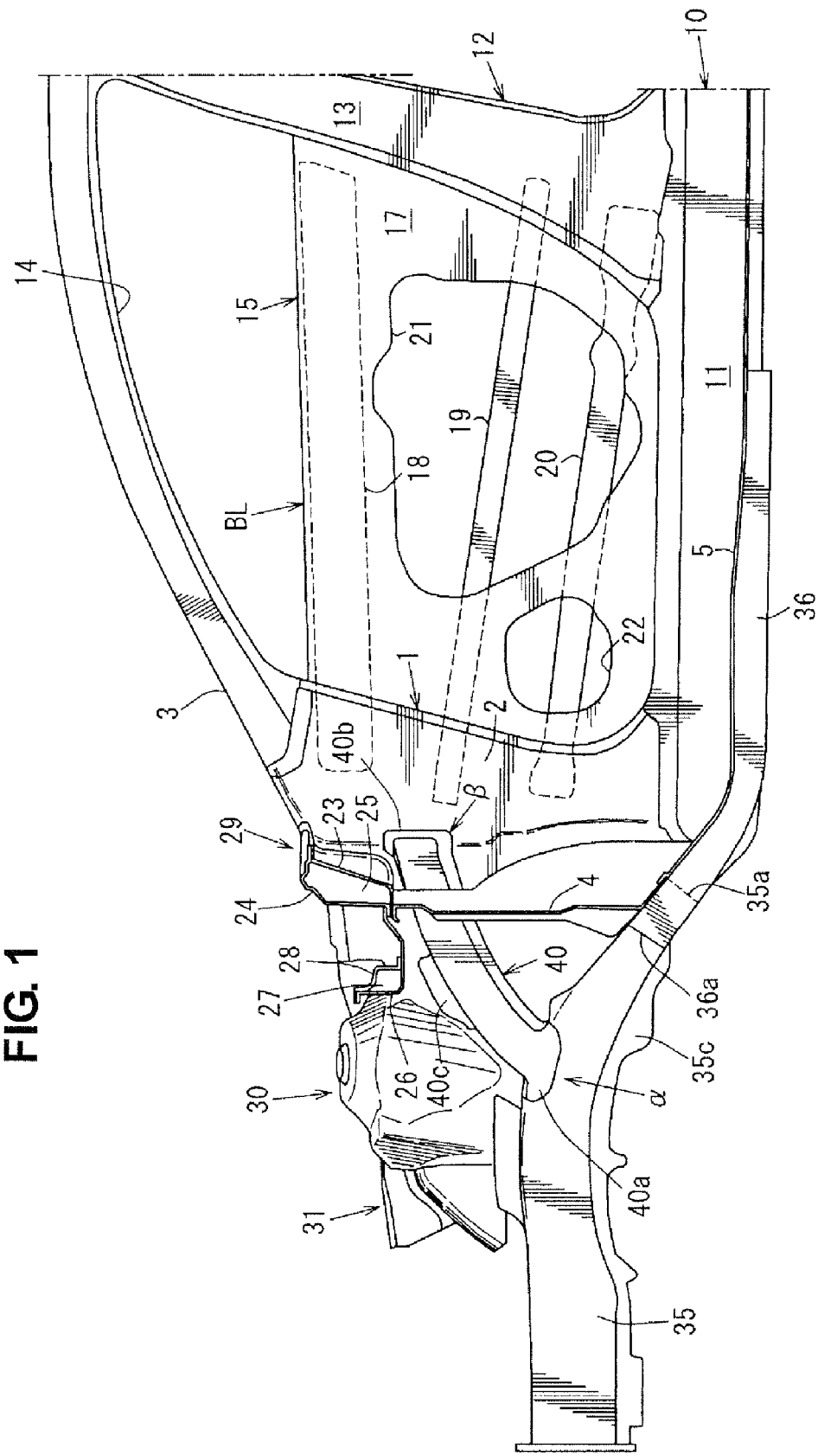
FIG. 1 is a side view showing a front structure of an automotive vehicle according to a first embodiment of the present invention.
Figure 2:
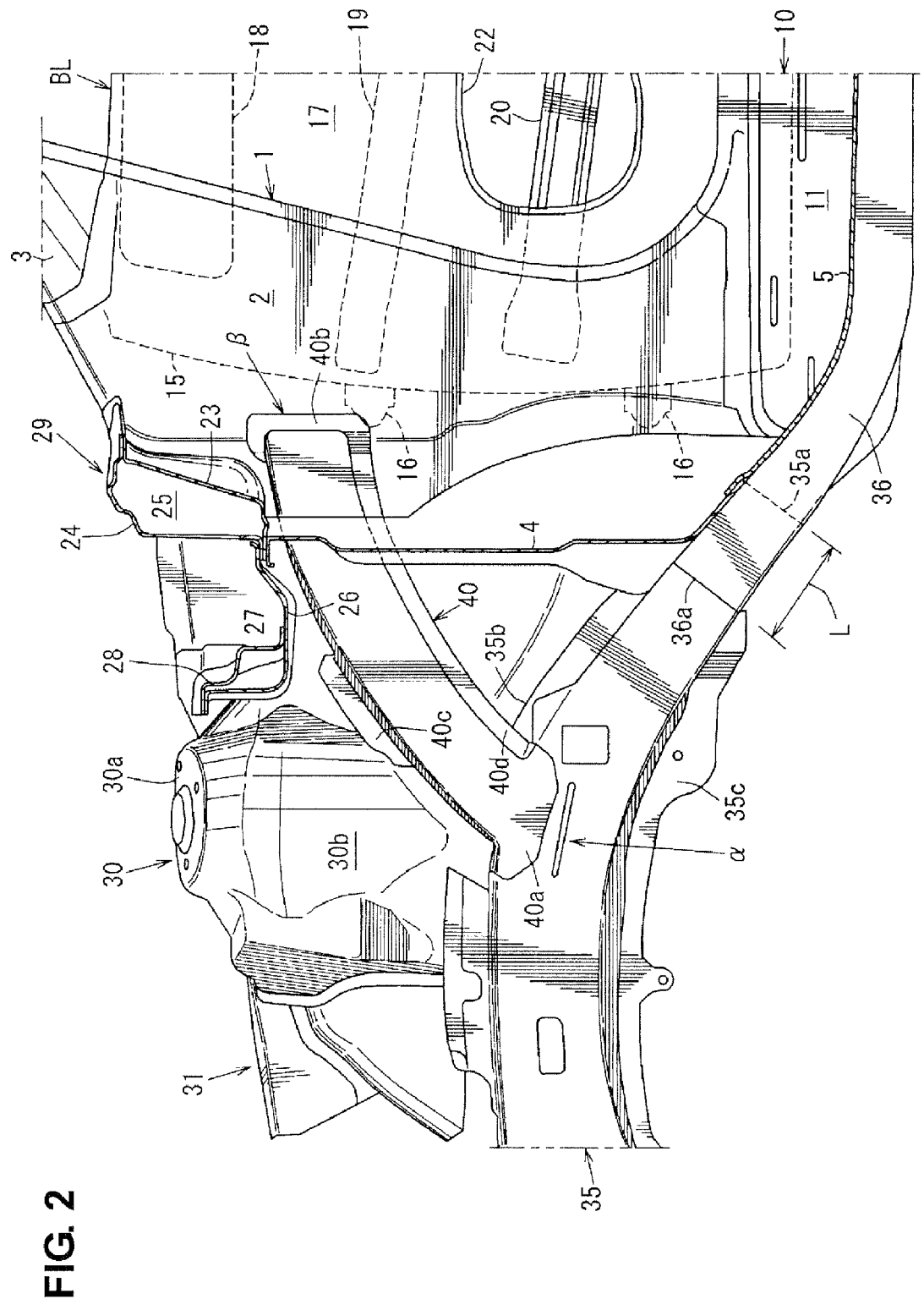
FIG. 2 is an enlarged view of a major part of FIG. 1.
Figure 3:
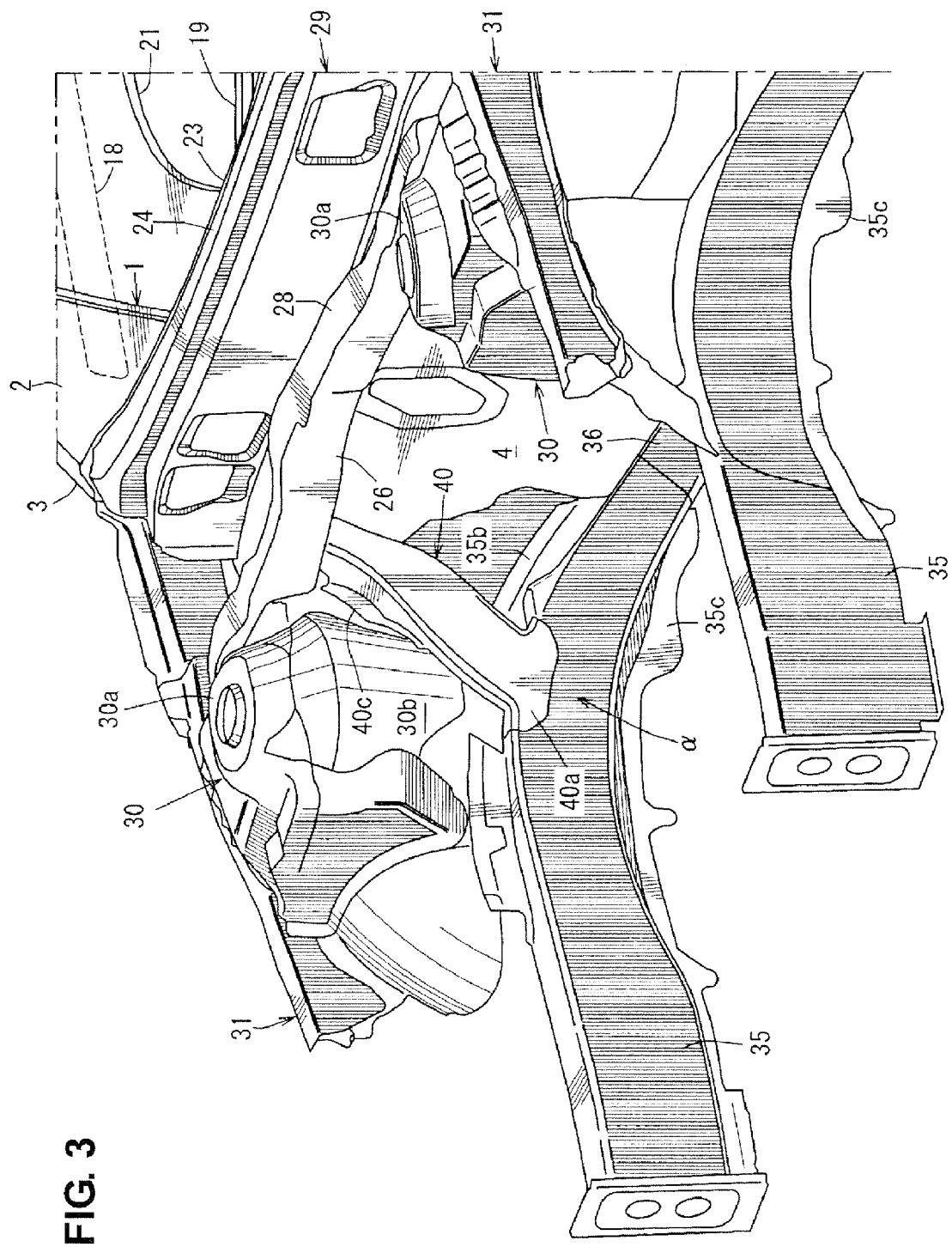
FIG. 3 is a perspective view of the major part of FIG. 1.
Figure 4:
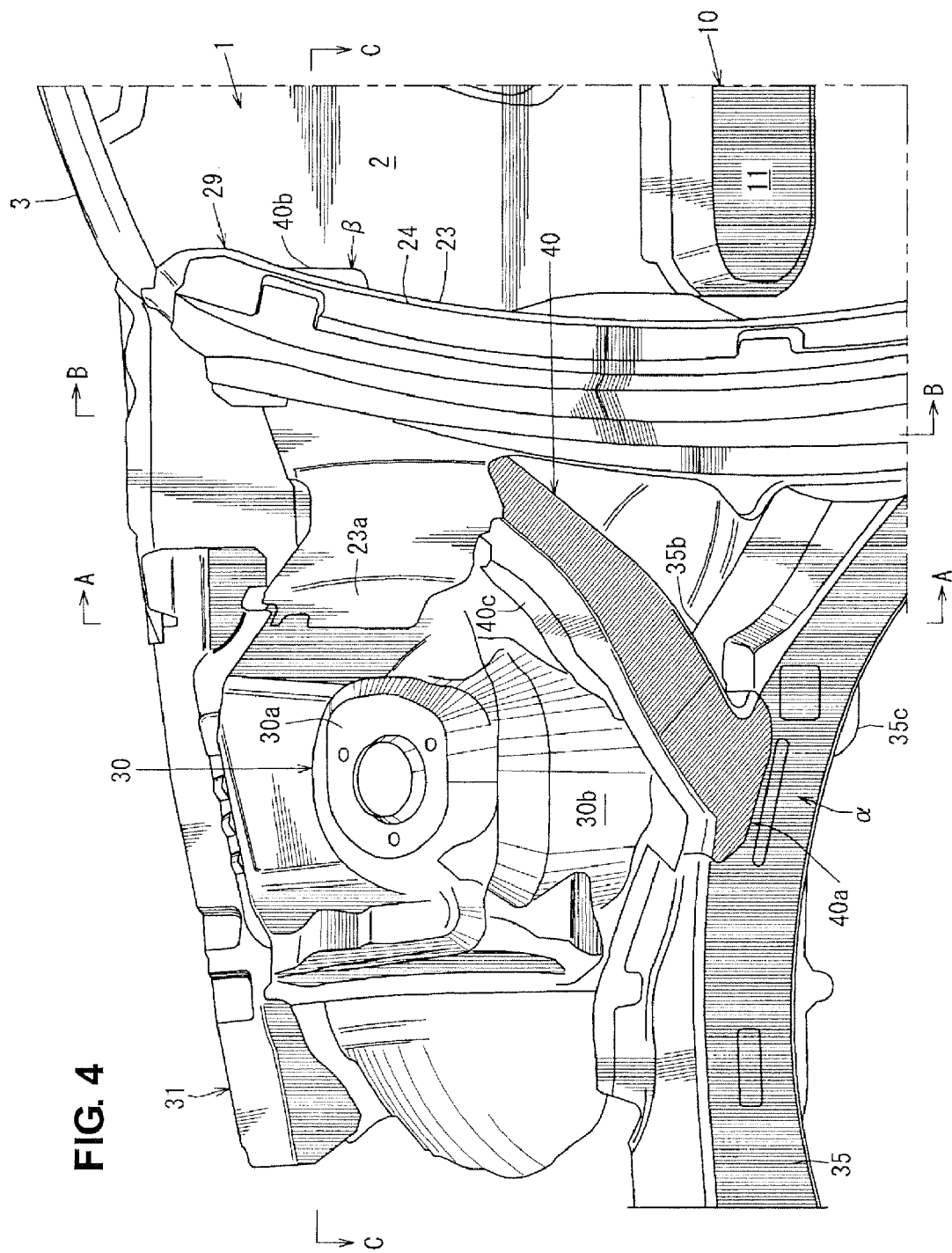
FIG. 4 is a perspective view of a structure of FIG. 2, excluding a cowl front member and a cowl front cross member, when viewed from the top.
Figure 5:
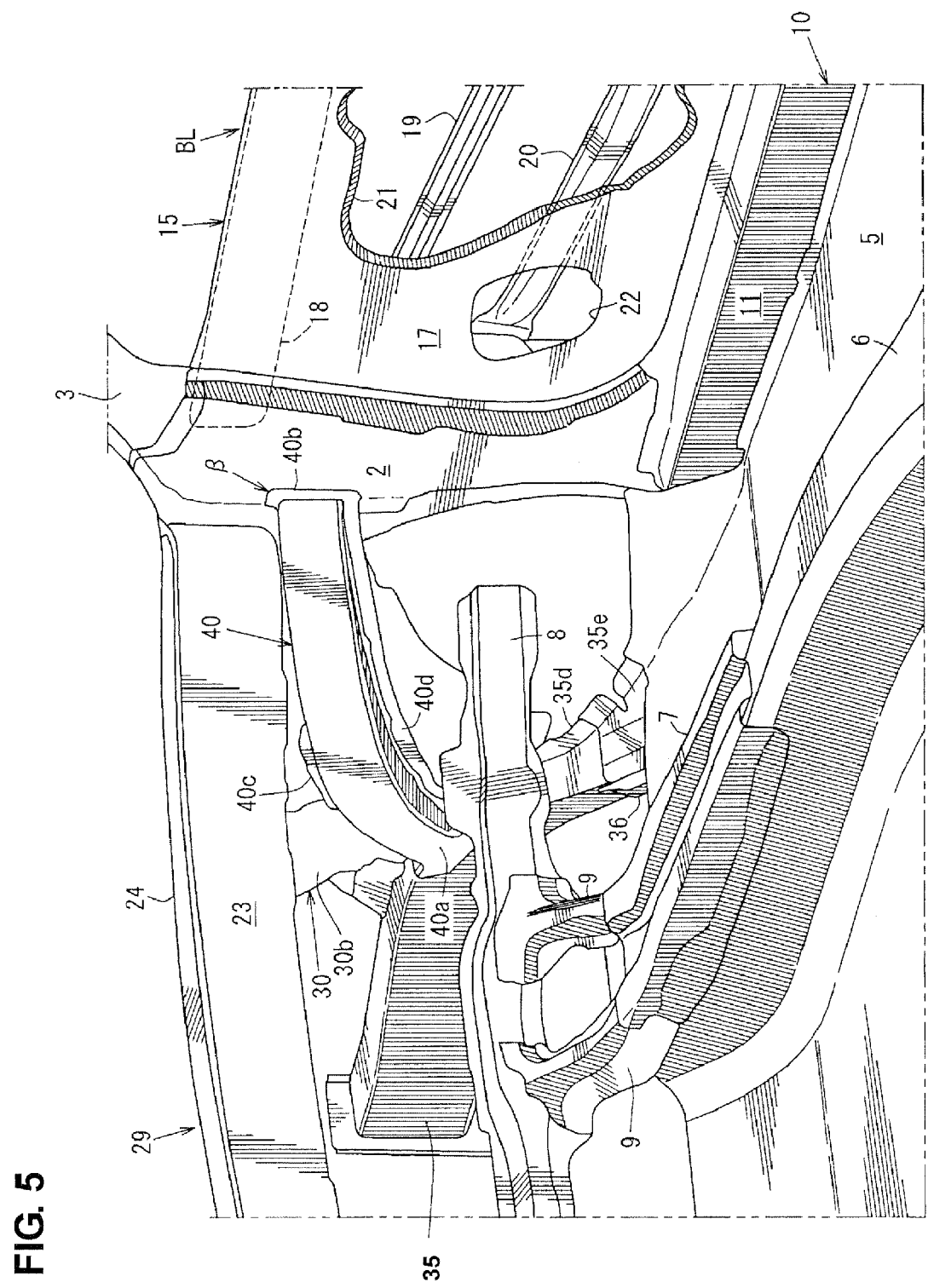
FIG. 5 is a perspective view of the front structure, excluding a dash lower panel, when viewed from the back.
Figure 6:
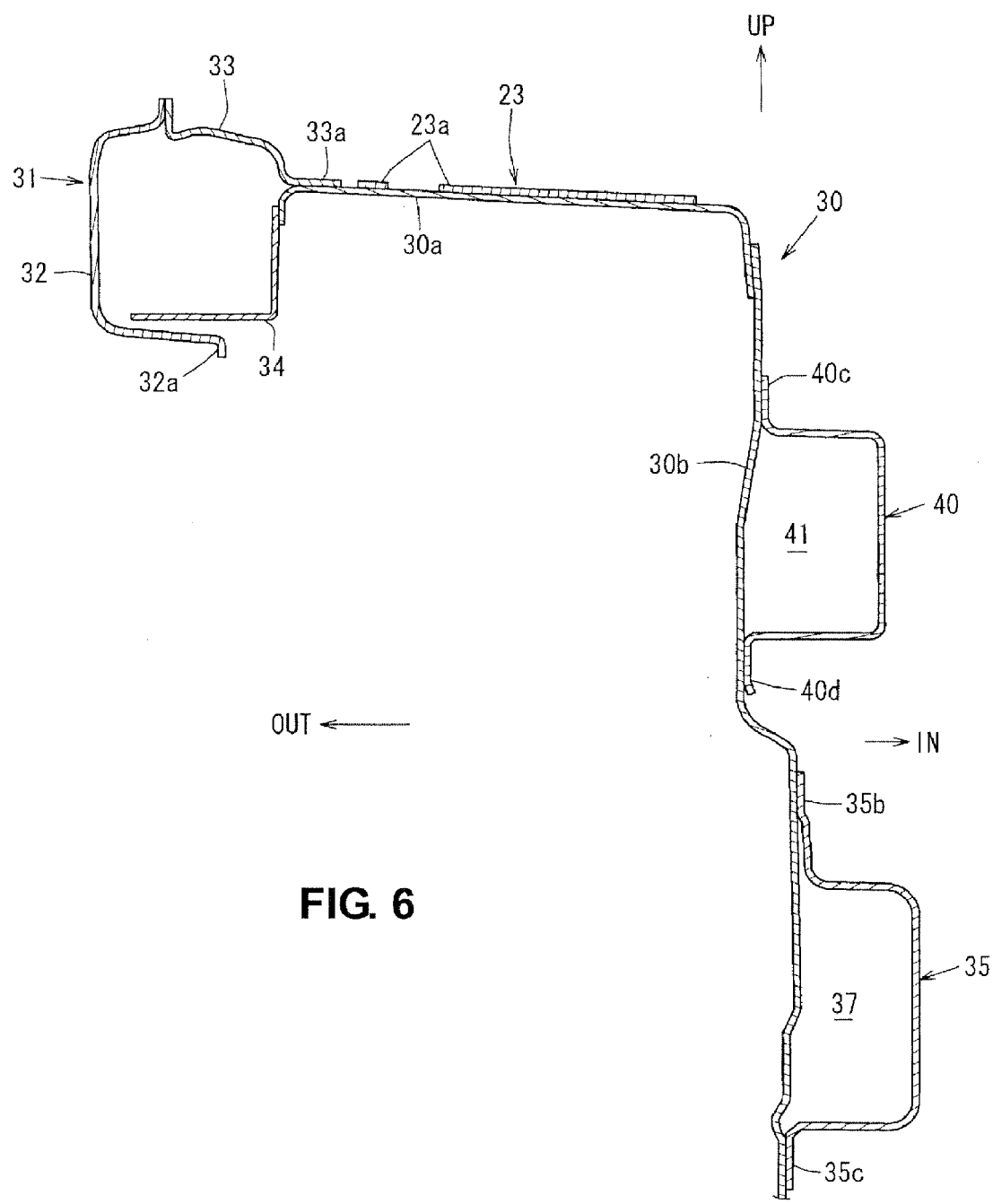
FIG. 6 is a sectional view taken along line A-A of FIG. 4.
Figure 7:
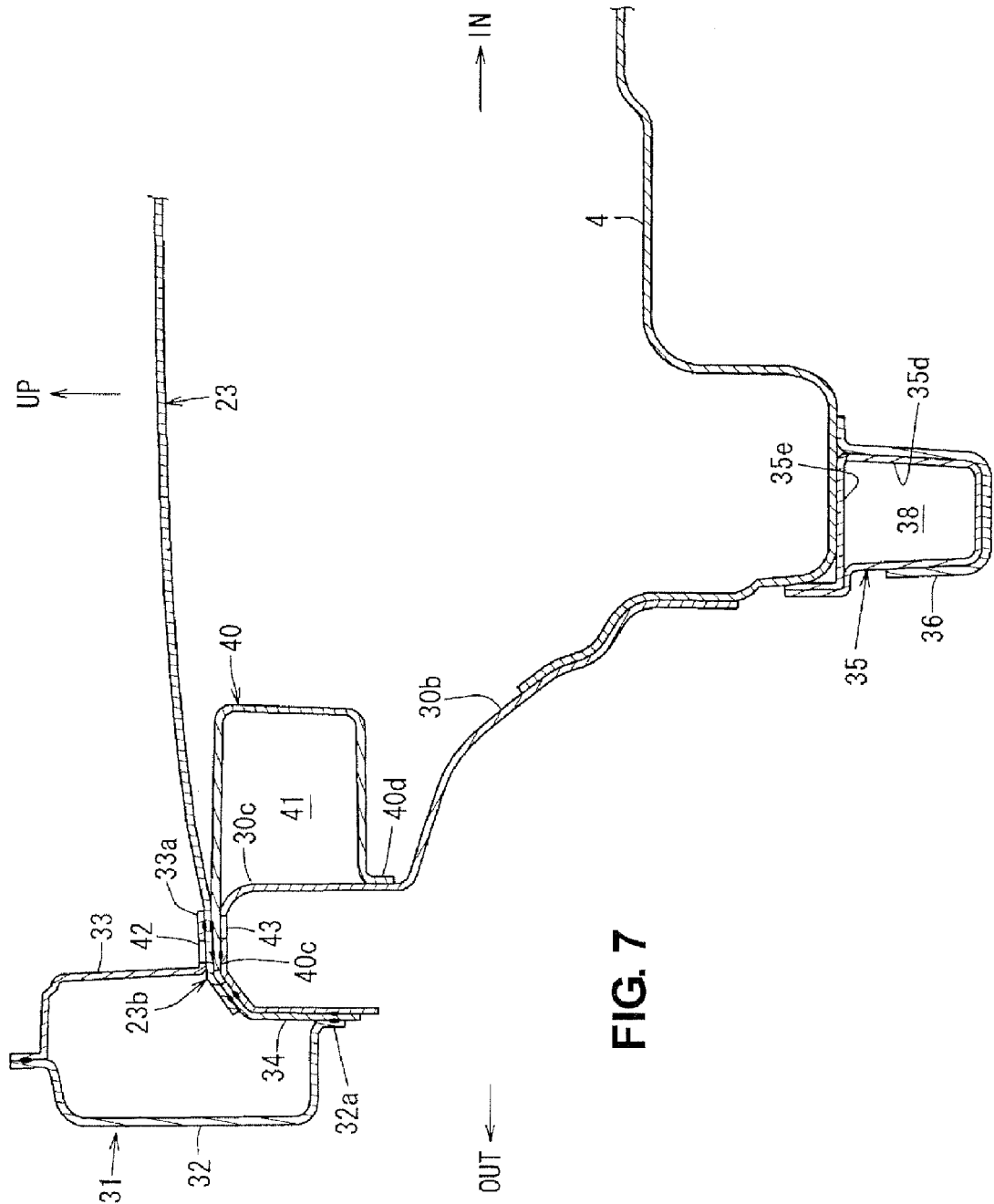
FIG. 7 is a sectional view taken along line B-B of FIG. 4.
Figure 8:
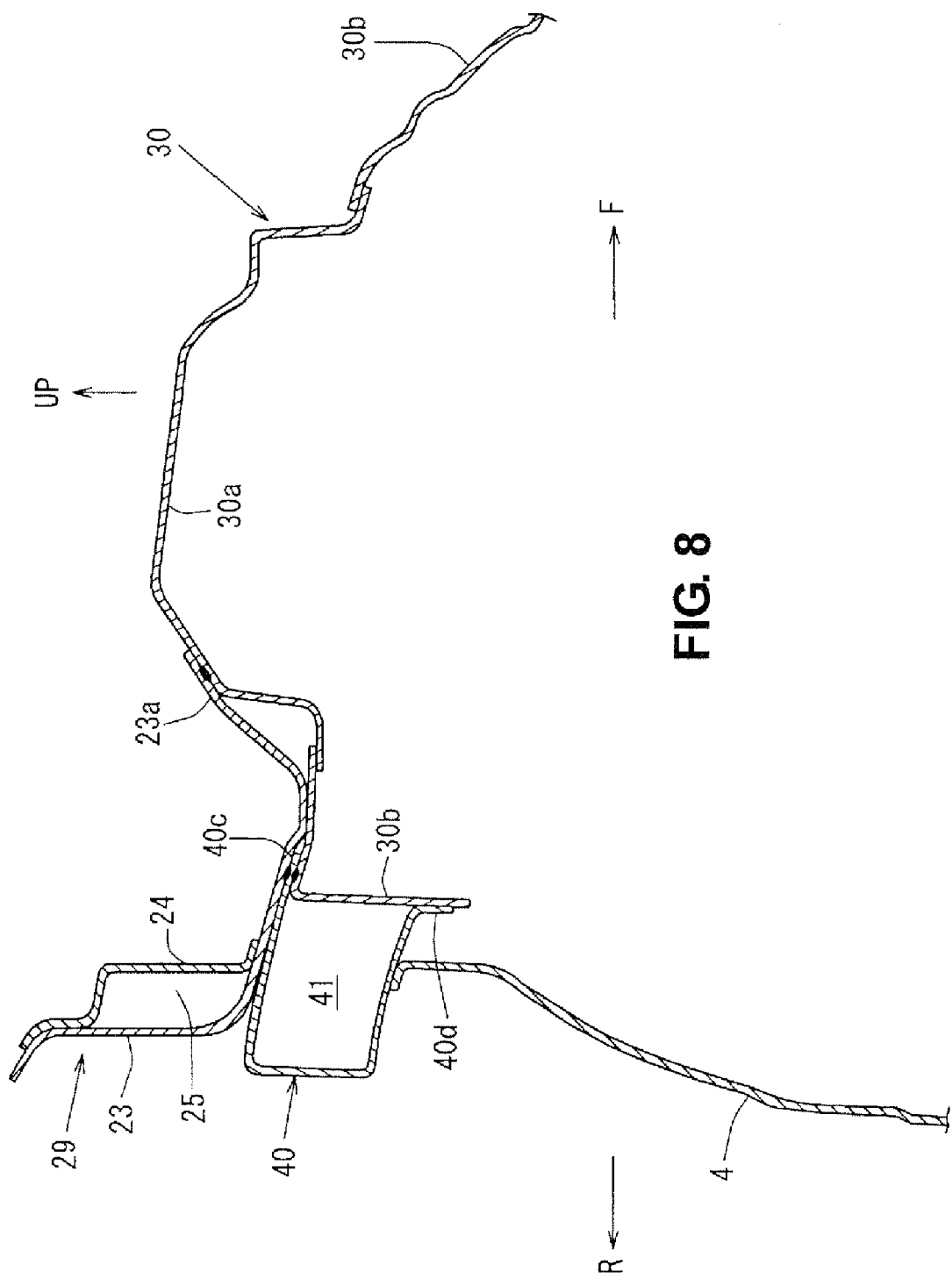
FIG. 8 is a sectional view taken along line C-C of FIG. 4.

FIG. 1 is a side view showing a front structure of an automotive vehicle according to a first embodiment of the present invention. FIG. 2 is an enlarged view of a major part of FIG. 1. FIG. 3 is a perspective view of the major part of FIG. 1. FIG. 4 is a perspective view of a structure of FIG. 2, excluding a cowl front member and a cowl front cross member, when viewed from the top. FIG. 5 is a perspective view of the front structure, excluding a dash lower panel, when viewed from the back. FIG. 6 is a sectional view taken along line A-A of FIG. 4. FIG. 7 is a sectional view taken along line B-B of FIG. 4. FIG. 8 is a sectional view taken along line C-C of FIG. 4.

There is provided a pair of hinge pillars 1, 1 (only a right-side hinge pillar illustrated) as shown in FIGS. 1 and 2. The hinge pillar 1 is a vehicle-body rigidity member, which is comprised of a hinge pillar inner 2 and a hinge pillar outer that are joined, and has a closed pillar cross section that extends in a vehicle vertical direction.

A front pillar 3 is fixed to an upper portion of the hinge pillar 1 in such a manner that its front portion is relatively low and its rear portion is relatively high. A dash lower panel 4 is fixed to both hinge pillars 1, 1, specifically between both hinge pillar inners 2, 2, so as to partition an engine room from a vehicle compartment longitudinally.

A floor panel 5 is fixed to a rear end portion of a lower portion of the dash panel 4. The floor panel 5 extends rearward substantially horizontally and forms a bottom face of the vehicle compartment. At the floor panel 5 is formed a tunnel portion 6 that projects inside the vehicle compartment and extends longitudinally as shown in FIG. 5. The tunnel portion 6 may function as a main part of member providing a body rigidity of the vehicle.

As shown in FIG. 5, a tunnel member 7 is fixed to an upper portion of the tunnel portion 6 so as to extend longitudinally along the tunnel portion 6, and two closed cross section are formed at both upper-end corners between the tunnel member 7 and the tunnel portion 6. Thereby, the vehicle body rigidity can be improved.

Further, as shown in FIG. 5, a dash cross member 8 that has a U-shaped cross section is fixed to an inside face of the dash panel 4 so as to extend in a vehicle width direction, and a dash-cross closed cross section is formed between the dash cross member 8 and the dash lower panel 4 so as to extend in the vehicle width direction. Thereby, the rigidity of the front structure can be improved. Also, as shown in FIG. 5, an inside face of the dash cross member 8 and the tunnel member 7 are interconnected by both tunnel member fronts 9, 9 longitudinally.

Meanwhile, as shown in FIG. 5, at both-side portions of the floor panel 5 (only a right-side portion illustrated) are provided side sills 10, 10 that extend longitudinally. The side sill 10 is a vehicle-body rigidity member, which is comprised of a side sill inner 11 and a side sill outer that are joined, and has a side-sill closed cross section that extends longitudinally.

There is provided a center pillar 12 that interconnects the side sill 10 and a roof side rail vertically as shown in FIG. 1. The center pillar 12 is a vehicle-body rigidity member, which is comprised of a center pillar inner 13 and a center pillar outer that are joined, and has a center-pillar closed cross section that extends vertically.

Further, as shown in the same figure, a door opening 14 of a passenger for a front seat is formed so as to be enclosed with the hinge pillar 1, front pillar 3, side sill 10 and center pillar 12. A front door 15 is provided to open or close the door opening 14.

The front door 15 is attached to the hinge pillar 1 via a pair of door hinges 16, 16 so as to open or close as shown in FIG. 2. The front door 15 is comprised of a door inner panel 17 and a door outer panel that are joined. Further, a beltline reinforcement 18 is provided inside the front door 15 at a beltline portion BL of the door so as to extend longitudinally as shown in FIGS. 1, 2 and 5.

Herein, the door hinge 16 comprises a body-side hinge bracket that is attached to the hinge pillar outer, a door-side hinge bracket that is attached to a front end portion of the door inner panel 17, and a hinge pin that pivotally joint the both hinge brackets. Further, as shown in FIGS. 1, 2 and 5, between the door panel 17 and the door outer panel, namely inside the door, is provided a pair of impact bars 19, 20 that extends longitudinally with a slant in such a manner that their front portions are relatively high and their rear portions are relatively low.

The upper impact bar 19 is a member that can ensure the tension rigidity of the door outer panel, and the lower impact bar 20 is a member that can prevent the front door 15 from moving into the vehicle compartment at a vehicle side crash. A front end portion of the upper impact bar 19 is disposed below the beltline portion BL and the beltline reinforcement 18. Herein, a reference numeral 21 denotes an opening that is formed at the door inner panel 17 for disposition of a door module, and a reference numeral 22 denotes an opening that is formed at the door inner panel 17 for disposition of a speaker.

Herein, as shown in FIG. 2, a dash upper panel 23 is fixed to an upper-end bending portion of the dash lower panel 4, a cowl panel 24 is fixed to an upper portion and a front portion of the dash upper panel 23, and between the dash upper panel 23 and the cowl panel 24 is formed a cowl closed cross section 25 that extends in the vehicle width direction.

Further, as shown in the same figure, there is provided a cowl front member 26 that extends forward from a connection portion of the upper-end bending portion of the dash lower panel 4, a lower end portion of the dash upper panel 23, and a lower end portion of the cowl panel 24. Also, a cowl front cross member 28 is attached to an upper front portion of the cowl front member 26 to form a closed cross section 27 that extends in the vehicle width direction with a front-side vertical wall portion of the cowl front member 26.

Thus, the four member of the dash upper panel 23, cowl panel 24, cowl front member 26, and cowl front cross member 28 form a cowl box 29, an open box type of cowl box, which extends in the vehicle width direction.

A suspension tower 30 is disposed at a front location away from the dash lower panel 4 as shown in FIG. 2.

The suspension tower 30 is comprised of a suspension tower top 30a that is made of a thick plate member and an apron panel 30b that forms a tower portion and a wheel arch, which are joined integrally, as shown in FIG. 6 (sectional view taken along line A-A of FIGS. 4) and 8 (sectional view taken along line C-C of FIG. 4).

As shown in FIG. 2, the above-described cowl box 29 is located between the suspension tower 30 and the dash lower panel 4. As shown in FIG. 3, the both-side portions of the cowl front member 26 and the cowl front cross member 28 are connected to the suspension tower 30.

As shown in FIGS. 4 and 8, an extension portion 23a that extends forward is formed integrally with each of both-side portions of the dash upper panel 23, and this extension portion 23a is fixed to a rear face portion of the suspension tower top 30a by spot welding or the like as shown in FIG. 8.

An apron reinforcement 31 is provided on an outside of the upper portion of the suspension tower 30 so as to extend longitudinally as shown in FIGS. 1-4. The apron reinforcement 31 is comprised of an apron reinforcement outer 32, an apron reinforcement inner upper 33 and an apron reinforcement inner lower 34, as shown in FIG. 6 (sectional view taken along line A-A of FIGS. 4) and 7 (sectional view taken along line B-B of FIG. 4).

Further, a front side frame 35 is connected to an inside portion of the lower portion of the suspension tower 30 as shown in FIGS. 1-4. The front side frame 35 is a vehicle-body rigidity member that is provided so as to extend longitudinally at each side of the engine room and connect to the suspension tower 30, a rear end 35a of which bends downward and connects to a front portion of the floor frame 36 (see FIG. 2).

In the present embodiment, as shown in FIG. 2, the rear end 35a of the front side frame 35 and a front end 36a of the front frame 36 is overlapped with a specified length L.

The front side frame 35 is provided, as shown in FIG. 6, so that connecting flanges 35b, 35c are fixed to the apron panel 30b so as to form a closed cross section 37 that extends longitudinally.

Further, as shown in FIG. 7, the front side frame 35 is comprised of a lower frame 35d and an upper frame 35e, and provided to connect to the lower portion of the dash lower panel 4 by forming a closed cross section 38 that connects to the above-described closed cross section 37 (see FIG. 6) between the both frames 35d, 35e.

Also, as shown in FIGS. 2 and 7, the floor frame 36 is a vehicle-body rigidity member, which connects to the lower portion of the dash lower panel 4 and the lower portion of the floor panel 5. Further, as shown in this figure, there is provided a support frame 40 that extends upward and rearward from a portion α of the front side frame near the suspension tower 30 substantially straight and connect to the upper portion of the hinge pillar 1.

The support frame 40 is made of a metal plate with a U-shaped cross section as shown in FIGS. 6, 7 and 8, and comprises a lower end flange 40a that is joined to the front side frame 35, an upper end flange 40b that is joined to hinge pillar inner 2 of the hinge pillar 1, and a middle upper flange 40c and a middle lower flange 40d that are formed integrally with a middle portion, in the longitudinal direction, of the support frame 40 as shown in FIG. 2.

The support frame 40 is joined to the apron panel 30b as shown in FIGS. 6, 7 and 8, so a closed cross section 41 is formed between the support frame 40 and the apron panel 30b so as to extend longitudinally.

That is, at the cross section point shown in FIG. 6, the middle upper flange 40c and the middle lower flange 40d are joined to the inner face of the apron panel 30b so as to form the closed cross section 41 between the support frame 40 and the apron panel 30b.

At the cross section point shown in FIG. 7, a gate-shaped portion 30c is formed integrally with an upper outside portion of the apron panel 30b, and the middle upper flange 40c and the middle lower flange 40d are joined to this gate-shaped portion 30c so as to form the closed cross section 41 between the gate-shaped portion 30c of the apron panel 30b and the support frame 40.

As shown in FIG. 7, three of a lower joining flange 32a of the apron reinforcement outer 32, a lower portion of the apron reinforcement inner lower 34, and an outside lower portion of the gate-shaped portion 30c are joined together by spot welding.

Further, as shown in FIG. 7, three of an outside end portion 23b of the dash upper panel 23, an upper portion of the apron reinforcement inner lower 34, and an upper corner portion of the gate-shaped portion 30*c* are joined together by spot welding.

Also, as shown in FIG. 7, an opening 42 (or a notch) is formed at a lower joining flange 33*a* of the apron reinforcement inner upper 33, and three of the outside end portion 23*b* of the dash upper panel 23, the middle upper flange 40*c* of the support frame 40, and an upper-face outside portion of the gate-shaped portion 30*c* are joined together by spot welding.

Additionally, as shown in FIG. 7, an opening 43 (or a notch) is formed at an upper-face inside portion of the gate-shaped portion 30*c*, and three of the lower joining flange 33*a* of the apron reinforcement inner upper 33, the outside end portion 23*b* of the dash upper panel 23, the middle upper flange 40*c* of the support frame 40 are joined together by spot welding.

At the cross section point shown in FIG. 8, the middle upper flange 40*c* and the middle lower flange 40*d* are joined to a rear-side face of the apron panel 30*b* so as to form the closed cross section 41 between the apron panel 30*b* and the support frame 40. Herein, three of the middle upper flange 40*c*, the dash upper panel 23, and the apron panel 30*b* are joined together by spot welding as shown in FIG. 8. Further, as shown in this figure, the extension portion 23*a* of the dash upper panel 23 is joined to the rear-face portion of the suspension tower top 30*a* by spot welding.

The support frame 40 extends just below the cowl box 29 and connects to the upper portion of the upper portion of the hinge pillar inner 2 of the hinge pillar 1 as shown in FIG. 5, and the upper face portion of the support frame 40 and the lower face portion of the cowl box 29 (specifically, a lower face portion of the dash upper panel 23 forming the cowl box 29) are joined as shown in FIG. 8.

Further, as shown in FIG. 2, a hinge-pillar connection portion β of the support frame 40 (specifically, a portion of the upper flange 40*b* of the support portion that connects to the hinge pillar inner 2) is positioned substantially at the same level as the disposition of the front end portion of the impact bar 19 to the front door 15 and the disposition of the door hinge 16.

Further, as shown in FIG. 2, the beltline reinforcement 18 is provided at the beltline portion BL above the impact bar 19, and the above-described hinge-pillar connection portion β of the support frame 40 is positioned at a level that is between the beltline reinforcement 18 and the impact bar 19.

In the figures, an arrow F shows a vehicle forward, an arrow R shows a vehicle rearward, an arrow IN shows a vehicle inward, an arrow OUT shows a vehicle outward, and an arrow UP shows a vehicle upward.

In the above-described front structure of an automotive vehicle, when the vehicle frontal crash occurs, the impact load from the front is inputted to the front side frame 35. This inputted impact load is conveyed from the rear end 35*a* of the front side frame 35 to the floor frame 36. Meanwhile, the inputted impact load is also conveyed directly and efficiently to the upper portion of the hinge pillar 1 via the support frame 40 that extends substantially straight from the portion α of the front side frame 35 near the suspension tower 30. Thereby, the impact load can be properly dispersed to the hinge pillar 1 and the front pillar 3, so that the forward deformation of the cabin can be restrained.

As described above, the front structure of an automotive vehicle of the present embodiment comprises the pair of hinge pillars 1, 1, the dash lower panel 4 to interconnect the pair of hinge pillars 1, 1 so as to partition the engine room from the vehicle compartment, the suspension tower 30 that is disposed in front of and away from the dash lower panel 4, the front side frame 35 that extends in the vehicle longitudinal direction and connects to the suspension tower 30, the rear end 35*a* of which bends downward and connects to the front portion of the floor frame 36, and the support frame 40 that is provided to extend upward and rearward from the portion α of the front side frame 35 near the suspension tower 30 substantially straight and connect to the upper portion of the hinge pillar 1 (see FIG. 2).

According to this front structure, the impact load at the vehicle frontal crash can be efficiently transmitted to the upper portion of the hinge pillar 1 via the support frame 40 extending substantially straight, so that the impact load can be properly dispersed to the hinge pillar 1 and the front pillar 3. Accordingly, the forward deformation of the cabin can be restrained properly.

Further, the cowl box 29 is provided between the dash lower panel 4 and the suspension tower 30, and the support frame 40 is provided to extend just below the cowl box 29 and connect to the upper portion of the hinge pillar 1 (see FIG. 2). Thereby, since the support frame 40 is provided to extend just below the cowl box 29 and connect to the upper portion of the hinge pillar 1, the connection portion of the support frame 40 to the hinge pillar 1 can be properly located at the upper portion of the hinge pillar 1. Accordingly, the restraint of the forward deformation of the cabin can be achieved effectively.

Also, the upper face portion of the support frame 40 and the lower face portion of the cowl box 29 are joined (see FIG. 8). Thereby, the rigidity of the cow-box side portion can be increased with the joining structure of the support frame 40 and the cowl box 29 by utilizing the support frame 40.

In addition, the front end portion of the impact bar 19 provided at the front door 15 is positioned substantially at the same level as the connection portion β of the support frame 40 to the hinge pillar 1 (see FIG. 2). Thereby, the efficient transmission and dispersion of the impact load can be achieved by utilizing the existing impact bar 19 in the front door 15.

Further, the beltline reinforcement 18 is provided at the beltline portion BL of the front door 15, the front end portion of the impact bar 19 is disposed below the beltline portion BL at the front door 15, and the connection portion β of the support frame 40 to the hinge pillar 1 is positioned at the level that is between the beltline portion BL and the front end portion of the impact bar 19 (see FIG. 2). Thereby, the impact load is transmitted to both the beltline reinforcement 18 and the impact bar 19 via the support frame 40 and the hinge pillar 1. Accordingly, the efficient transmission of the impact load can be achieved with a superior flexibility of layout of the impact bar 19 (flexibility of location of the front end portion of the impact bar 19 that is provided for a vehicle side crash).

Also, the front door 15 is attached to the hinge pillar 1 via the door hinge 16 so as to open or close, and the connection portion β of the support frame 40 to the hinge pillar 1 is positioned at the level that corresponds to the door hinge 16 (see FIG. 2). Thereby, the impact load can be transmitted surely from the hinge pillar 1 to the impact bar 19 and the beltline reinforcement 18 via the door hinge 16.

Figure 9:
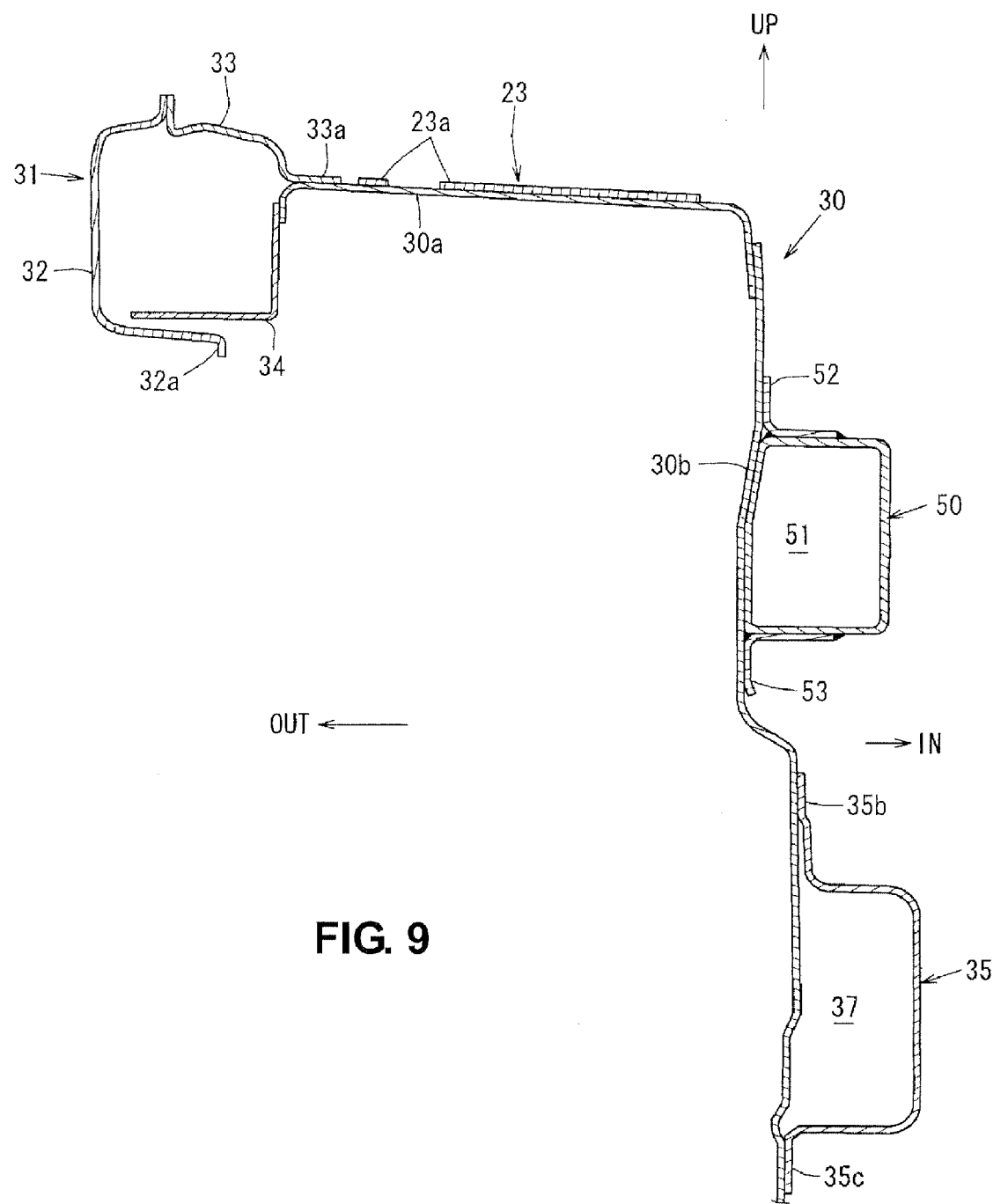
FIG. 9 is a sectional view of a modified front structure of an automotive vehicle, which corresponds to FIG. 6.
Figure 10:
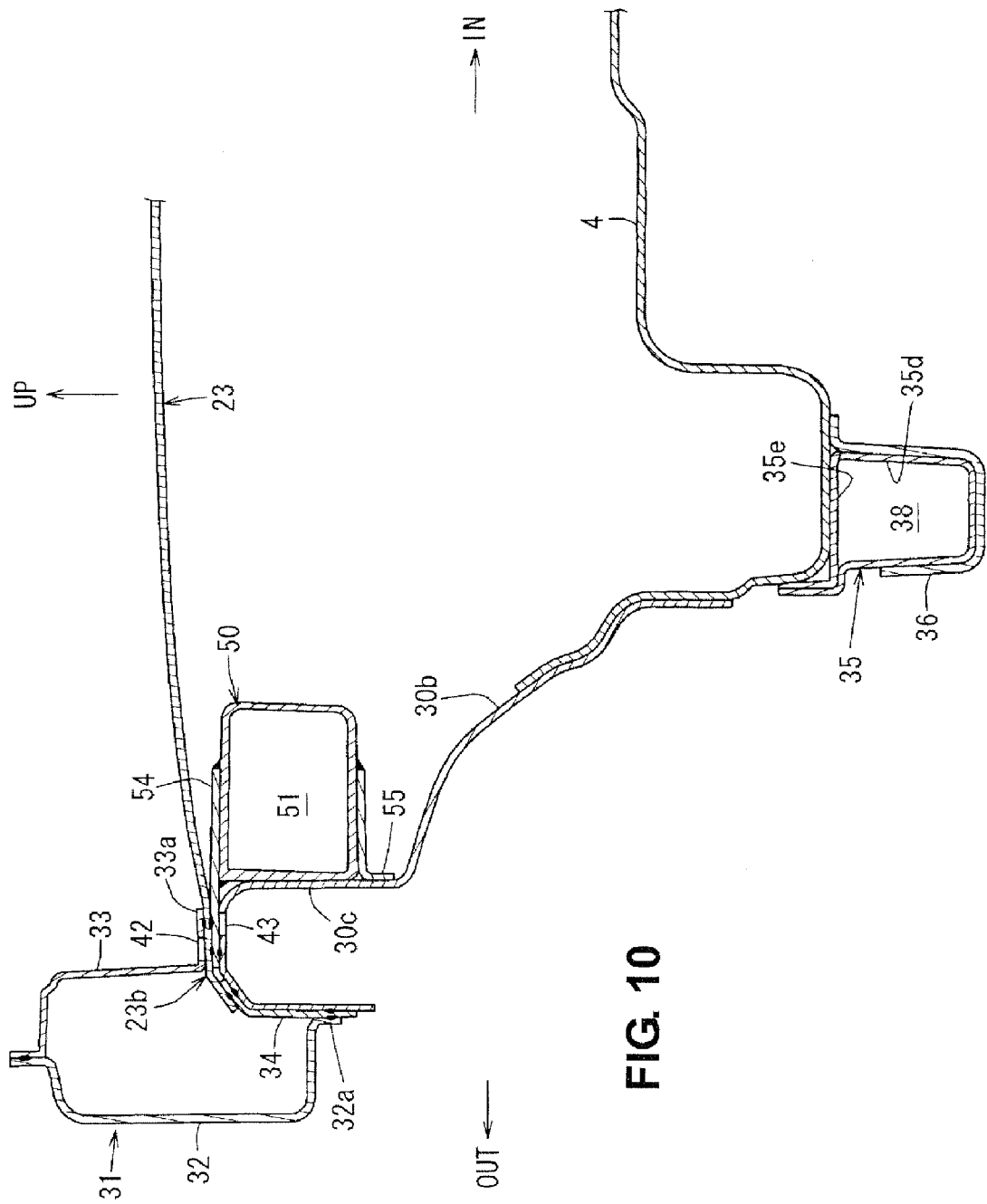
FIG. 10 is a sectional view of the modified front structure, which corresponds to FIG. 7.
Figure 11:
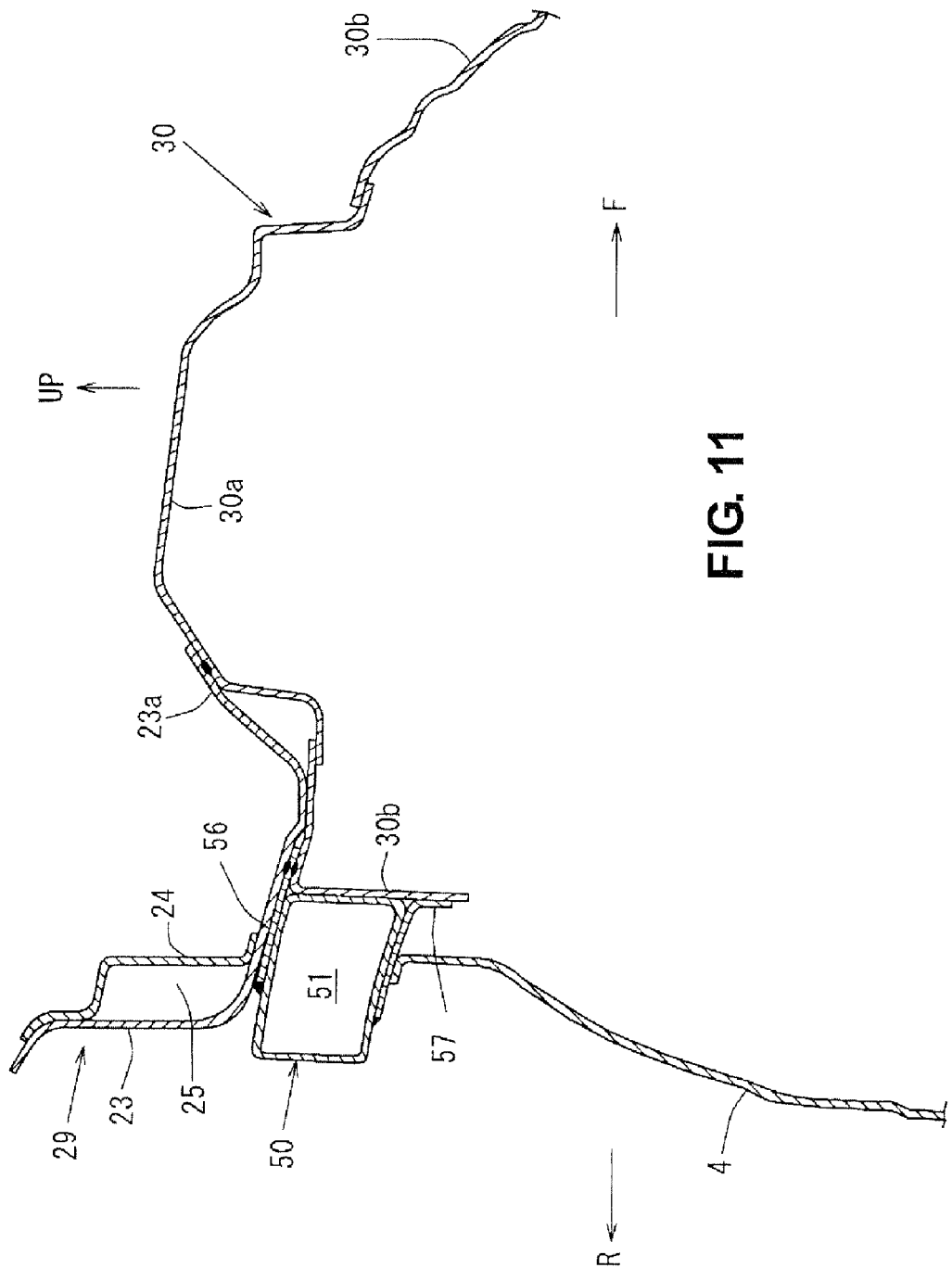
FIG. 11 is a sectional view of the modified front structure, which corresponds to FIG. 8.

FIGS. 9-11 show a modified front structure of an automotive vehicle of the present embodiment. FIG. 9 is a sectional view of the modified front structure of an automotive vehicle, which corresponds to FIG. 6. FIG. 10 is a sectional view of the modified front structure, which corresponds to FIG. 7. FIG. 11 is a sectional view of the modified front structure, which corresponds to FIG. 8.

Although the support frame 40 is made of the metal plate member with the substantially-U-shaped cross section in the above-described embodiment, according to the modified front structure shown in FIGS. 9-11, a support frame 50 is made of a rectangular pipe or a member that is made by hydro-forming process, and a longitudinally-extending closed cross section 51 is only formed by this frame 50.

Flanges 52-57 for joining to the front side frame 35, suspension tower 30, cowl box 29 and hinge pillar 1 and others, not illustrated, are previously welded to the support frame 50.

The support frame 50 is attached to the inner face of the apron panel 30b with the upper and lower flanges 52, 53 as shown in FIG. 9 at this sectional point.

The support frame 50 is attached to the gate-shaped portion 30c of the apron panel 30b with the upper and lower flanges 54, 55 as shown in FIG. 10 at this sectional point.

The support frame 50 is attached to the rear-side face of the apron panel 30b and the lower face of the cowl box 29 with the upper and lower flanges 56, 57 as shown in FIG. 11 at this sectional point.

Thus, the support frame 50 with the closed cross section 51 is provided so as to extend upward and rearward substantially straight from the portion α of the front side frame 35 near the suspension tower 30 and connect to the upper portion of the hinge pillar 1, as shown in FIG. 2. Since the support frame 50 itself has a properly high rigidity, the transmission efficiency of the impact load can be further improved, thereby restraining the forward deformation of the cabin more surely.

Other components shown in FIGS. 9-11 are the same as those in the previous embodiment. Accordingly, those are denoted by the same reference characters as the previous embodiment, and detailed descriptions about those are omitted here.

Embodiment 2

Figure 12:
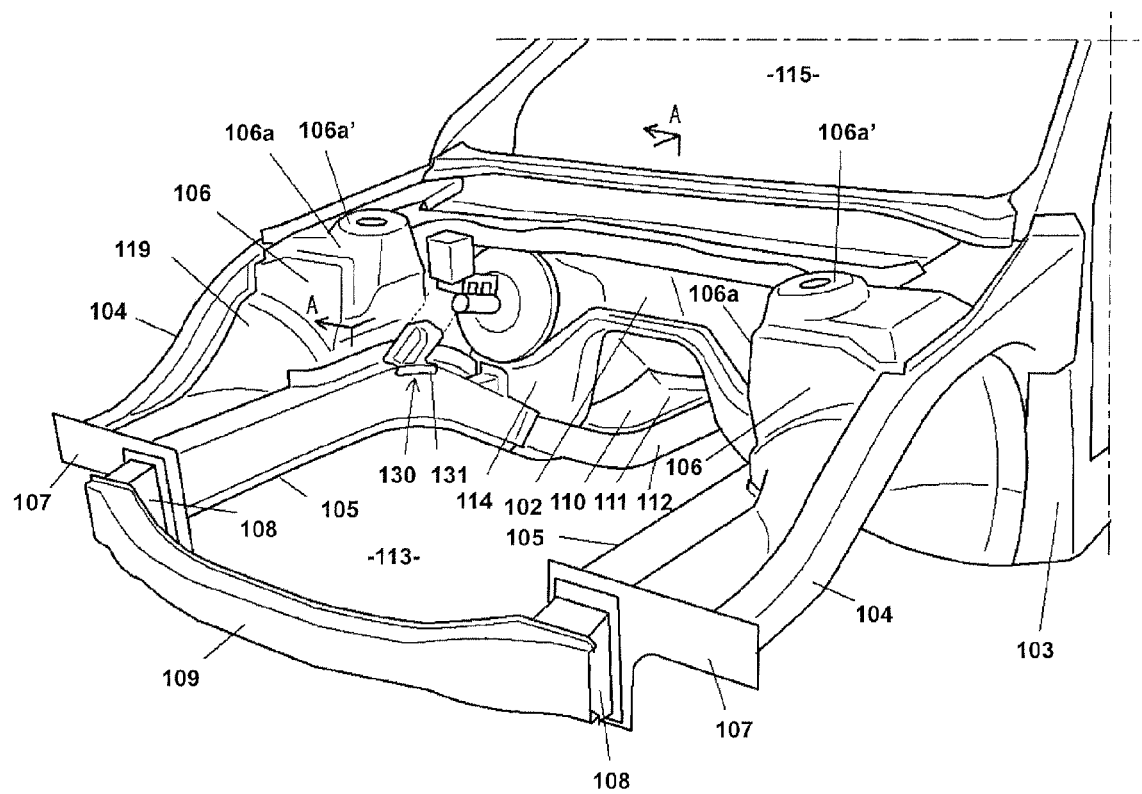
FIG. 12 is a perspective view of a front structure of an automotive vehicle according to a second embodiment of the present invention.

An automotive vehicle according to a second embodiment comprises a pair of hinge pillars 103, 103 that is provided at both ends of a dash panel 102 so as to extend vertically, as shown in FIG. 12. Front doors are pivotally attached to the hinge pillars 103 (only one illustrated).

Apron reinforcements 104, 104 are provided so as to extend forward from upper end portions of the hinge pillars 103, respectively.

Front side frames 105, 105 are provided so as to extend longitudinally substantially in parallel to the apron reinforcements 104, 104 in a plan view and to be located inside away from the apron reinforcements 104, 104. Each front side frame 105 has a closed cross section that is formed with an inner member and an outer member having a U-shaped cross section and extends longitudinally.

A front-wheel house 106 is provided between the apron reinforcement 104 and the front side frame 105 in the vehicle width direction.

Plates 107, 107 are attached respectively to front end portions of the front side frames 105 and the apron reinforcements 104 so as to connect these portions. A bumper reinforcement 109 is attached to the plates 107, 107 via crush boxes 108, 108 that may be deformed so as to crush when the impact load acts longitudinally.

A lower portion of the dash panel 102 bends rearward, and its lower end portion connects to a front end portion of a floor panel 110. A tunnel portion 111 is provided substantially at the center, in the vehicle width direction, of the lower portion of the dash panel 102 and the floor panel 110 so as to extend longitudinally.

A rear portion of the front side frame 105 bends downward beside the wheel house 106, and its rear end portion connects to a front end portion of a floor frame 112 that extends longitudinally below the floor panel 110. The floor frame 112 forms a closed cross section that extends longitudinally with the floor panel 110.

Figure 13:
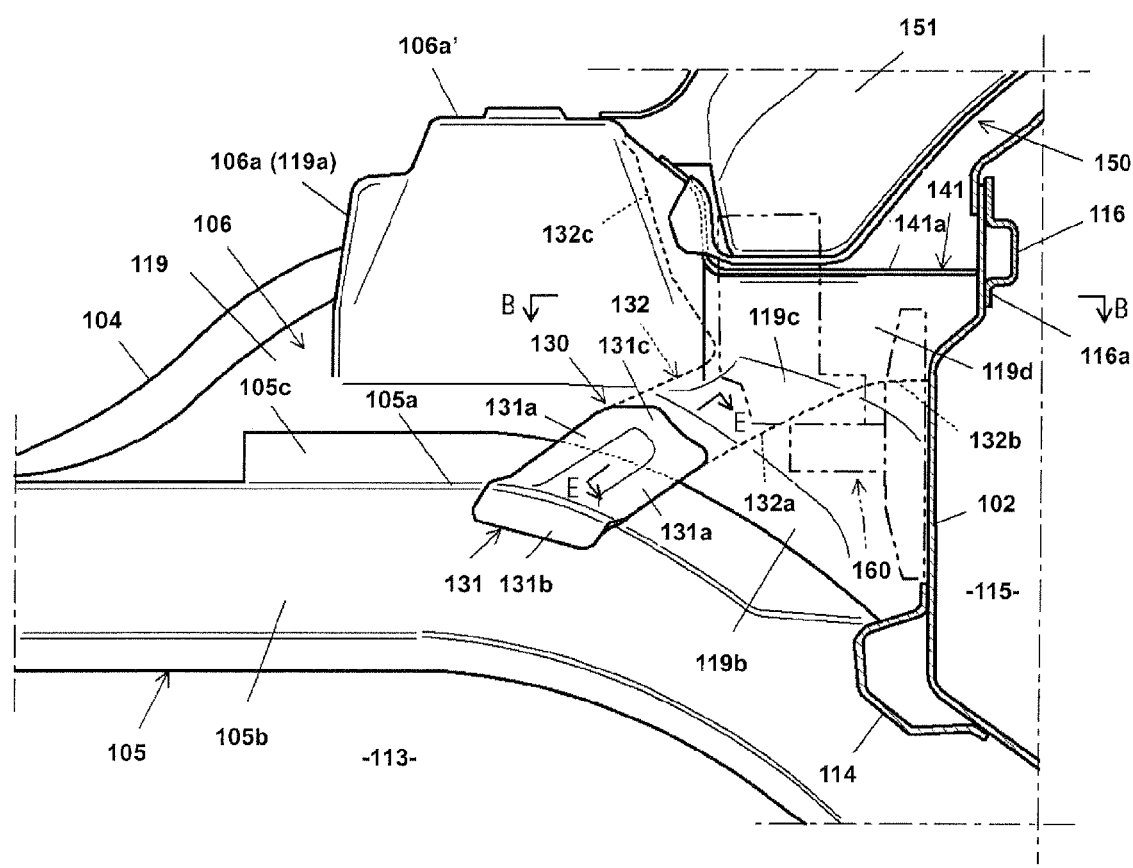
FIG. 13 is a sectional view taken along line A-A of FIG. 12.

A lower dash cross member 114 that has a hat-shaped cross section is provided at a front face (a face on a side of the engine room 113) of the dash panel 102 so as to form a closed cross section, which extends along a front end portion of the tunnel portion 111 between the front side frames 105, 105, with the dash panel 102 as shown in FIG. 13.

Figure 14:
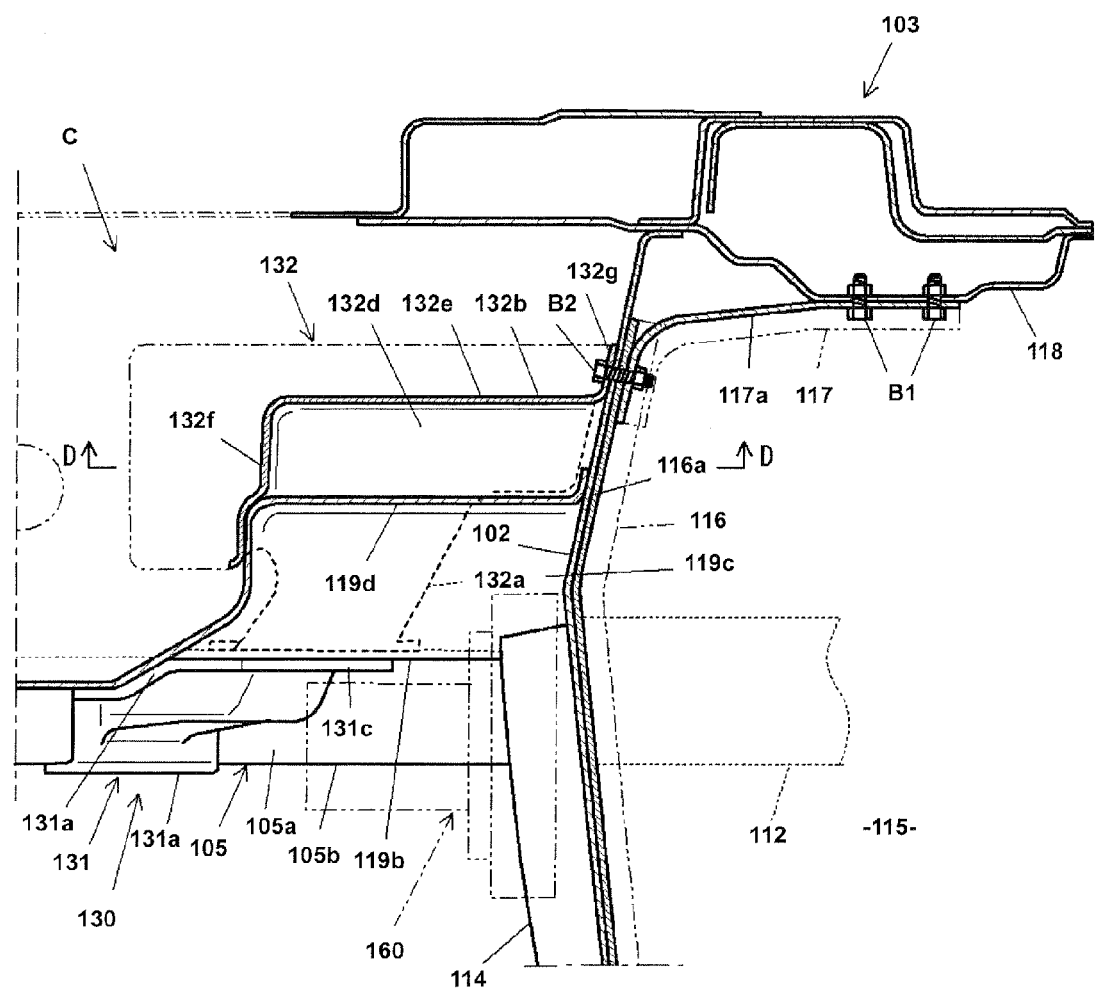
FIG. 14 is a sectional view taken along line B-B of FIG. 13.

As shown in FIGS. 13 and 14, at an upper portion of the rear face (a face on a side of a vehicle compartment 115) of the dash panel 102 is provided an upper dash cross member 116 that has a hat-shaped cross section extending in the vehicle width direction. Both-end portions of the upper dash cross member 116 are connected to an inner panel 118 that forms an inner face of the hinge pillar 103 via a gusset 117 that has substantially the same cross-section shape as the member 116. Specifically, the gusset 117 is fastened in such a manner that rear-end portions of its flanges 117a, 117a are fastened to the inner panel 118 by bolt and nuts B1, B1 and a front-end portion of its flange 117a is fastened by a bolt and nut B2 together with a flange portion 116a of an end portion of the upper dash cross member 116, the dash panel 102, and a flange 132g of a rear end portion of a rear member 132 of a support frame 130, which will be described below. Herein, the dash panel 102, upper dash cross member 116, and gusset 117 form a closed cross section X that extends in the vehicle width direction between the hinge pillars 103, 103.

Figure 15:
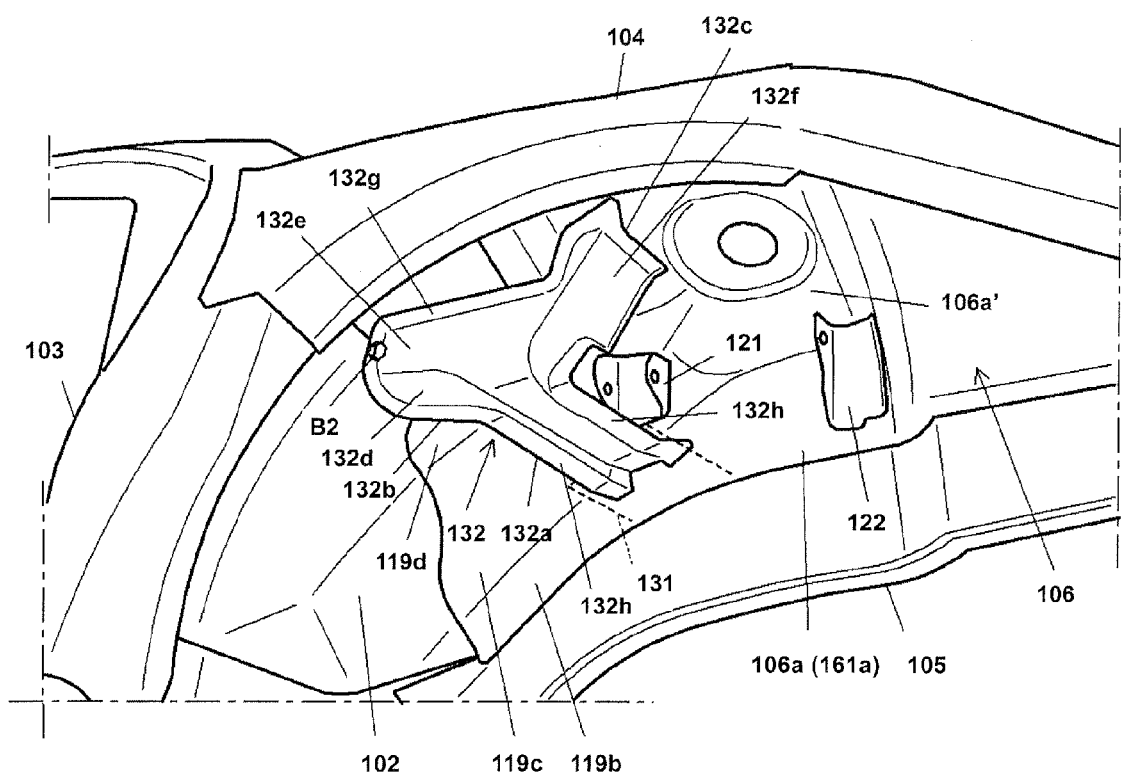
FIG. 15 is a perspective view in a direction of an arrow C in FIG. 14, when viewed from the bottom.

As shown in FIGS. 12 and 13, the wheel house 106 is formed by an arch-shaped rear portion of a wheel house inner panel 119, an outside-end portion of which is joined to the apron reinforcement, and an inner-end portion of which is joined to the front side frame 105. At its upper portion is provided a suspension tower portion 106a (119a) to accommodate a suspension damper, coil spring, and so on, which is formed by the wheel house panel 119 projecting upward and inward in a tower shape. As shown in FIG. 15, suspension support members 121, 122 to support a suspension upper arm are attached to a back face of the suspension tower portion 106a of the wheel house inner panel 119, which is on an opposite side to the engine room 113.

Figure 16:
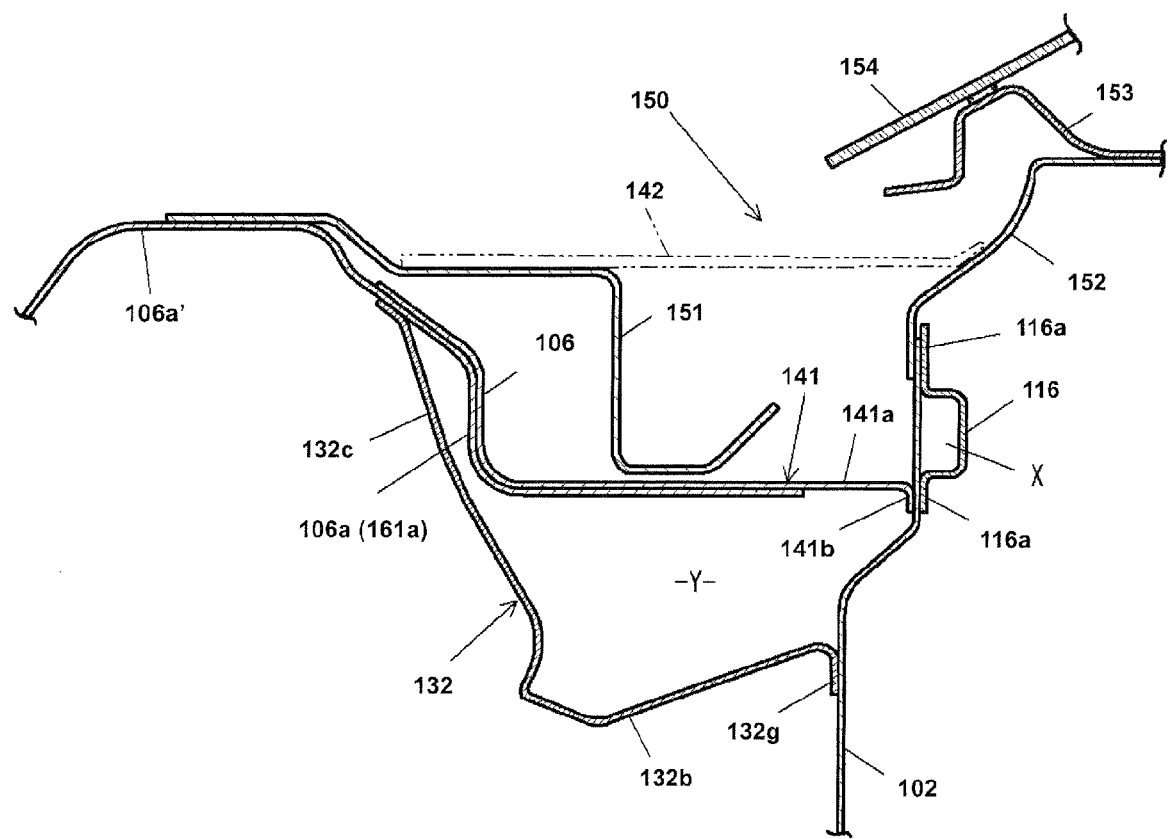
FIG. 16 is a sectional view taken along line D-D of FIG. 14.

As shown in FIG. 16, there is provided a first connection panel 141 that longitudinally connects the dash panel 102 to a top portion 106a' (suspension support portion) of the suspension tower portion 106a to which the suspension damper and the like are fixed at a level of the upper dash cross member 116. A rear portion of this first connection panel 141 behind the suspension tower portion 106a is formed by a horizontally lateral face portion 141a. A flange 141b at its rear-end portion is joined to the dash panel 102 together with the lower flange 116a of the upper dash cross member 116.

Further, as shown in FIGS. 13 and 16, a cowl portion 150 is provided between the dash panel 102 and the top portion 106a' of the suspension tower portion 106a so as to connect the apron reinforcements 104, 104 to the hinge pillars 103, 103 at a level above the first connection panel 141.

The cowl portion 150 comprises a cowl front panel 151 that extends forward to connect to the top portion 106a' of the suspension tower portion 106a, a dash upper panel 152 that is provided above the dash panel 102, and a cowl panel 154 that connects to the dash upper panel 152 to support a front end portion of a windshield 153.

As shown in FIG. 16, there is provided a second connection panel 142 between the end portion of the cowl front panel 151 and the end portion of the dash upper panel 152 so as to interconnect these end portions longitudinally. The end portion of the second connection panel 142 on the side of the apron reinforcement 104 is joined to the reinforcement 104. Herein, the second connection panel 142 is provided to function as a reinforcement member in the longitudinal direction as well as a support member for a windshield wiper.

The front side frame 105 bends downward at its curve portion 105a as describe above. Herein, it may be necessary to prevent the curve portion 105a from being broken (bending greatly) when the impact load acts on the front end portion of the front side frame 105.

Accordingly, there is provided a support frame 130 in the present embodiment, as shown in FIG. 13. Its front end portion is connected to a portion of the front side frame 105 beside the suspension tower portion 106a of the wheel house 106, and its rear end portion extends upward and rearward and connects to a portion of the dash panel 102 (vehicle-body member) behind the wheel house 106.

In this case, according to the vehicle of the present embodiment, as shown in FIGS. 13 and 14, a master cylinder 160 of a brake device is attached to a front face of the dash panel 102 in front of a driver's seat and in back of the wheel house 106 in such a manner that a front portion of the master cylinder 160 attached is located near the suspension tower portion 106a of the wheel house 106. Accordingly, it may be difficult to provide a whole part of the support frame 130 on an engine-room-side face of the wheel house inner panel 119 from a space perspective.

Thus, according to the present embodiment, the support frame 130 comprises a front member 131 and a rear member 132, and the front member 131 is provided on the engine-room-side face of the wheel house inner panel 119, while the rear member 132 is provided on another face of the panel 119 that is opposite to the engine-room-side face.

Hereinafter, this stricture will be described in detail. The front member 131 is provided so as to extend upward and rearward along the engine-room-side face of the wheel house inner panel 119 up to a location with a specified distance away from a front end of the muster cylinder 160. The front member 131 is formed to have a hat-shaped cross section, having flange portions 131a, 131a at its both-side portions. Its front and lower end portions have flange portions 131b, 131c with no projections. The front-end (lower-end) flange portion 131b is joined to the upper face 105 and the side face 105b of the inside member of the front side frame 105, the side flange portions 131a, 131a are joined to the upper flange portion 105c of the inner member of the front side frame 105 and an outside vertical face portion 119b of the wheel house inner panel 119, and the rear-end (upper-end) flange portion 131c is joined to the outside vertical face portion 119b of the wheel house inner panel 119.

Meanwhile, the rear member 132 is provided so as to extend upward and rearward along the along the back face of the wheel house inner panel 119 that is opposite to the engine-room side as shown in FIG. 15. Its rear end portion connects to a portion of the dash panel 102 behind the wheel house 106.

Specifically, the rear member 132 comprises a front portion 132a and a rear portion 132b. The front portion 132a is provided at a lower face of a slant face portion 119c that extends obliquely outward from an upper end of the outside vertical face portion 119b of the wheel house inner panel 119. The front portion 132a has a hat-shaped cross section, having flange portions 132h, 132h at both-side portions. These flange portions 132h, 132h are joined to the slant face portion 119c of the wheel house inner panel 119.

Figure 17:
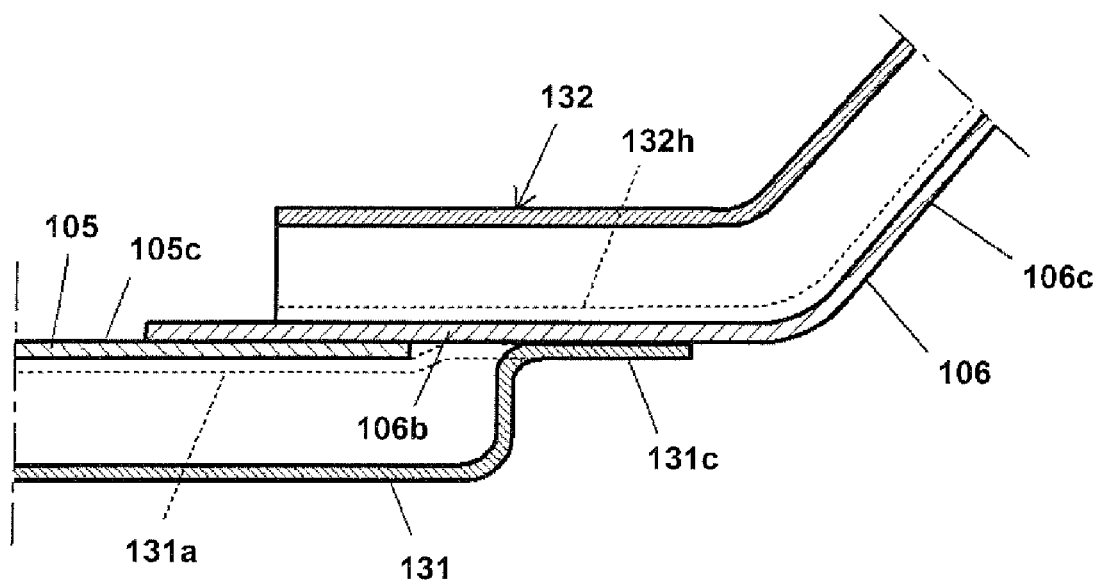
FIG. 17 is a sectional view taken along line E-E of FIG. 13.
Figure 18:
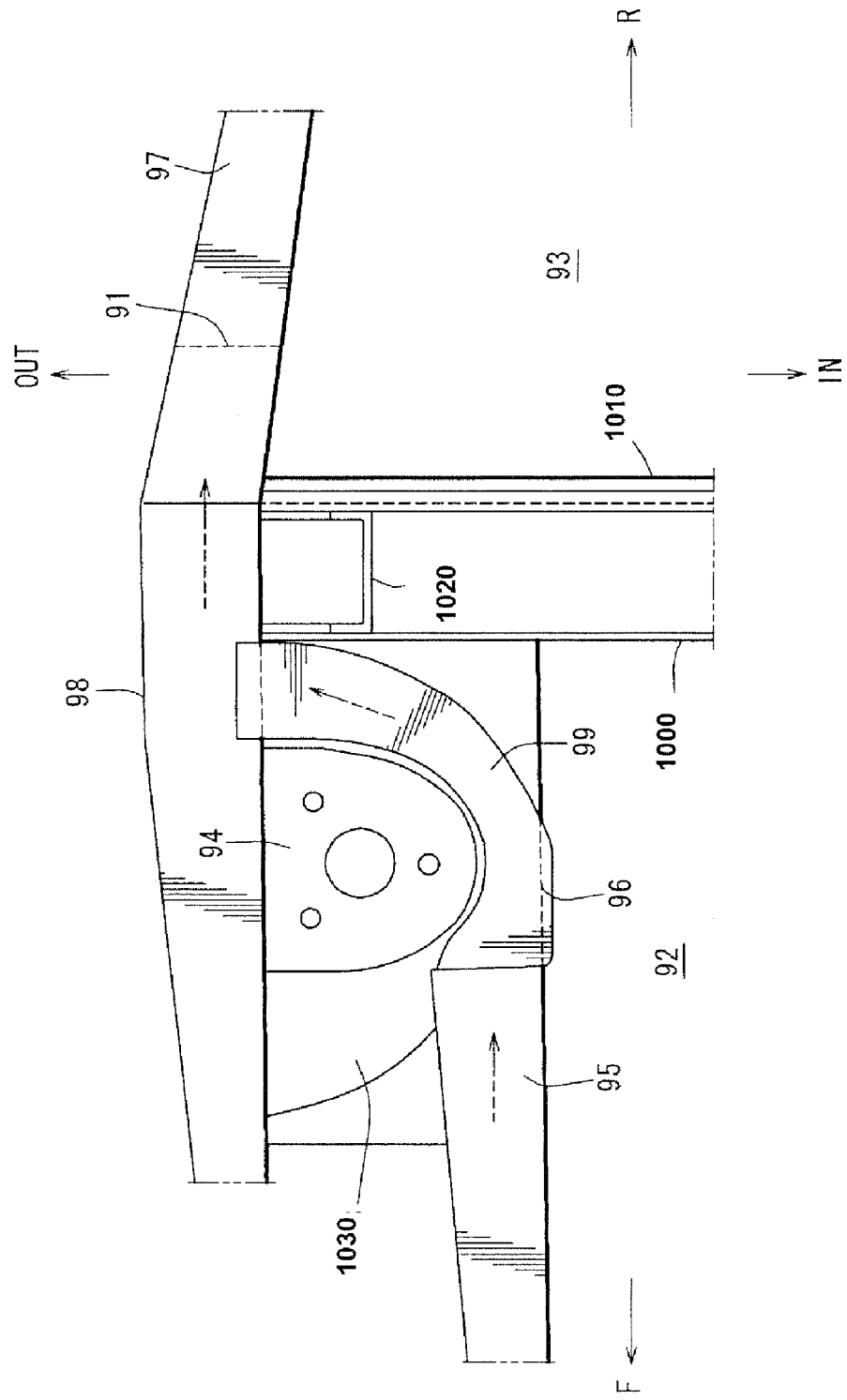
FIG. 18 is a plan view of a major part of a conventional front structure of an automotive vehicle.

As shown in FIG. 17, the rear member 132 is provided to be overlapped with the rear end portion (upper end portion) of the front member 131. This is to ensure a sufficient strength at a connection portion between the front member 131 and the rear member 132.

Meanwhile, as apparent from FIGS. 13 and 16, the rear portion 132b of the rear member 132 connects to the portion of the dash panel 102 behind the wheel house 106 as described above, and has an enlarged portion 132c that extends near the top portion 106a' of the suspension tower portion 106a. Further, the rear portion 132b includes a lower face portion 132d, a side face portion 132e, a front face portion 132f, and a flange portion 132g around these face portions 132d, 132e, 132f. The flange portion 132g is joined to the an outside vertical face portion 119d of the wheel house inner panel 119, the dash panel 102, the first connection panel 141, and the top portion 106a' of the suspension tower portion 106a at the wheel house inner panel 119. Thus, as shown in FIG. 16, the first connection panel 141 and the rear portion 132b of the rear member 132 of the support frame 130 form a closed cross section Y that is provided from the dash panel 102 to the top portion 106a' of the suspension tower portion 106a.

Further, the rear end portion of the flange portion 132g of the rear portion 132 of the support frame 130 that is attached to the dash panel 102 is fastened by the bolt and nut B2 together with the dash panel 102, and flange portions 116a, 117a of the upper dash cross member 116 and the gusset 117. Thus, the rear member 132 is joined to the upper dash cross member 116 via the dash panel 102.

Next, the function of the present embodiment will be described.

When the impact load is inputted to the bumper reinforcement 109 at the vehicle frontal crash and the like, the crash boxes 108, 108 crash and the inputted impact load acts on the front side frames 105, 105.

In this case, since the front side frame 105 is connected to the floor frame 102 at its rear end portion, the impact load can be dispersed to the vehicle-body rear portion.

Further, according to the present embodiment, the support frame 130 is provided so that its front end portion is connected to the portion of the front side frame 105 beside the suspension tower portion 106a of the wheel house 106, and its rear end portion extends upward and rearward and connects to the portion of the dash panel 102 behind the wheel house 106. Accordingly, the impact load can be dispersed to the dash panel 102 as well via the support frame 130. Thus, the front side frames 105, 105 can be restrained properly from bending when the impact load acts thereon.

Also, since the rear portion 132b of the rear member 132 of the support portion 130 is connected to the upper dash cross member 116 via the dash panel 102, the impact load inputted to the support frame 130 from the front side frame 105 can be dispersed to the hinge pillar 103 as well via the upper dash cross member 116. Accordingly, even if the impact load would be larger, the front side frame 105 can be properly restrained from bending.

Herein, since the rear member 132 of the support frame 130 is provided so that the rear portion 132b expands to the top portion 106a' (suspension support portion) of the suspension tower 106a of the wheel house 106, the impact load acting on the support frame 130 from the front side frame 105 can be dispersed to the dash panel 102 and the top portion 106a' of the suspension tower 106a. Accordingly, even if the impact load would be larger, the front side frame can be properly restrained from bending.

Further, there is provided the first connection panel 141 (connection member) that interconnects the dash panel 102 and the top portion 106a' of the suspension tower 106a longitudinally, and the first connection panel 141 and the rear portion 132b of the rear member 132 of the support frame 130 form the closed cross section Y that is provided from the dash panel 102 to the top portion 106a' of the suspension tower 106a. Thereby, the rigidity between the dash panel 102 and the top portion 106a' of the suspension tower 106a can be increased. Accordingly, the curve portion of the front side frame 105 can be restrained from being broken (bending greatly) when the impact load acts.

Herein, since the rear portion of the front side frame 105 is connected to the other front side frame as well via the lower dash cross member 114, the impact load inputted to one of the frames can be also transmitted to the other one. Thereby, the above-described restraint of the front side frame 105 can be further improved.

According to the present embodiment, particularly, the support frame 130 comprises the front member 131 and the rear member 132, and the front member 131 is provided on the engine-room-side face of the wheel house inner panel 119 (the panel forming the wheel house), and the rear member 132 is provided on another face of the panel 119 that is opposite to the engine-room-side face, the front end portion of the rear member 132 overlapping the rear end portion of the front member 131. Thereby, the rear half of the support frame 130 may not project toward the engine-room side of the wheel house 106. Accordingly, interference of the support frame 130 with any component provided behind the wheel house 106, such as a master cylinder of a brake device, can be prevented.

Herein, although it is provided on the side of the back face of the dash panel in the present embodiment, the upper dash cross member may be provided on the side of the front face of the dash panel. In this case, the rear half of the rear member of the support frame can be connected to the upper dash cross member directly.

The present invention should not be limited to the above-described embodiments, and any other modifications and improvements may be applied within the scope of a spirit of the present invention.

What is claimed is:

1. A front structure of an automotive vehicle, comprising:
a pair of hinge pillars;
a dash panel provided to interconnect the pair of hinge pillars so as to partition an engine room from a vehicle compartment;
a suspension tower disposed in front of and away from the dash panel;
an apron reinforcement provided to extend in a vehicle longitudinal direction on an outside of an upper portion of the suspension tower, a rear end of which is connected to the hinge pillar;
a front side frame provided to extend in the vehicle longitudinal direction on an inside of a lower portion of the suspension tower and connect to the suspension tower, a rear end of which bends downward and connects to a front portion of a floor frame; and
a support frame provided to extend upward and rearward substantially straight on the inside of the suspension tower, a front end of which is connected to a portion of the front side frame near the suspension tower and a rear end of which is directly connected to an upper portion of the hinge pillar.

2. The front structure of an automotive vehicle of claim 1, wherein there is provided a dash cross member that interconnects the pair of hinge pillars so as to form a closed cross section with a front face or a rear face of the dash panel, and the support frame is provided so that a rear portion thereof connects to the dash cross member directly or via the dash panel.

3. The front structure of an automotive vehicle of claim 1, wherein the support frame comprises a front member and a rear member, and the front member is provided on an engine-room-side face of a panel forming the suspension tower, and the rear member is provided on another face of the panel that is opposite to the engine-room-side face, a front end portion of the rear member overlapping a rear end portion of the front member.

4. The front structure of an automotive vehicle of claim 3, wherein the rear member of the support frame is configured so that a rear portion thereof expands to a suspension support portion that is provided at an upper portion of the suspension tower.

5. The front structure of an automotive vehicle of claim 4, wherein there is provided a connection member that interconnects the dash panel and the suspension support portion longitudinally, and the connection member and a rear side of the rear member of the support frame form a closed cross section that is provided from the dash panel to the suspension support portion.

6. The front structure of an automotive vehicle of claim 1, wherein a cowl box is provided between the dash panel and the suspension tower so as to extend in a vehicle width direction, and the support frame is provided to extend just below the cowl box without contacting the cowl box.

7. The front structure of an automotive vehicle of claim 1, wherein a front door is attached to the hinge pillar via a door hinge so as to open or close, and the connection portion of the support frame to the hinge pillar is positioned at a height position that corresponds to the door hinge.

8. A front structure of an automotive vehicle, comprising:
a pair of hinge pillars;
a dash panel provided to interconnect the pair of hinge pillars so as to partition an engine room from a vehicle compartment;
a suspension tower disposed in front of and away from the dash panel;
an apron reinforcement provided to extend in a vehicle longitudinal direction on an outside of an upper portion of the suspension tower, a rear end of which is connected to the hinge pillar;
a front side frame provided to extend in the vehicle longitudinal direction on an inside of a lower portion of the suspension tower and connect to the suspension tower, a rear end of which bends downward and connects to a front portion of a floor frame; and
a support frame provided to extend upward and rearward substantially straight on the inside of the suspension tower, a front end of which is connected to a portion of the front side frame near the suspension tower and a rear end of which is connected to an upper portion of the hinge pillar,
wherein a front end portion of an impact bar longitudinally extending across a front door is positioned substantially at a same height position as a connection portion of the support frame to the hinge pillar.

9. A front structure of an automotive vehicle, comprising:
a pair of hinge pillars;
a dash panel provided to interconnect the pair of hinge pillars so as to partition an engine room from a vehicle compartment;
a suspension tower disposed in front of and away from the dash panel;

an apron reinforcement provided to extend in a vehicle longitudinal direction on an outside of an upper portion of the suspension tower, a rear end of which is connected to the hinge pillar;

a front side frame provided to extend in the vehicle longitudinal direction on an inside of a lower portion of the suspension tower and connect to the suspension tower, a rear end of which bends downward and connects to a front portion of a floor frame; and a support frame provided to extend upward and rearward substantially straight on the inside of the suspension tower, a front end of which is connected to a portion of the front side frame near the suspension tower and a rear end of which is connected to an upper portion of the hinge pillar, wherein a beltline reinforcement is provided at a beltline portion of a front door so as to extend longitudinally across the front door, a front end portion of an impact bar longitudinally extending across the front door is disposed below the beltline portion at the front door, and a connection portion of the support frame to the hinge pillar is positioned at a height position between the beltline portion and the front end portion of the impact bar.

10. The front structure of an automotive vehicle of claim 8, wherein the front door is attached to the hinge pillar via a door hinge so as to open or close, and the connection portion of the support frame to the hinge pillar is positioned at a height position that corresponds to the door hinge.

11. The front structure of an automotive vehicle of claim 9, wherein the front door is attached to the hinge pillar via a door hinge so as to open or close, and the connection portion of the support frame to the hinge pillar is positioned at a height position that corresponds to the door hinge.

* * * * *